US010305295B2

(12) United States Patent
Kelly-Morgan et al.

(10) Patent No.: US 10,305,295 B2
(45) Date of Patent: May 28, 2019

(54) ENERGY STORAGE CELL, CAPACITIVE ENERGY STORAGE MODULE, AND CAPACITIVE ENERGY STORAGE SYSTEM

(71) Applicant: Capacitor Sciences Incorporated, Menlo Park, CA (US)

(72) Inventors: Ian S. G. Kelly-Morgan, San Francisco, CA (US); Matthew R. Robinson, San Francisco, CA (US); Paul Furuta, Sunnyvale, CA (US); Daniel Membreno, Fremont, CA (US); Pavel Ivan Lazarev, Menlo Park, CA (US)

(73) Assignee: Capacitor Sciences Incorporated, Menlo Park, CA (US)

( * ) Notice: Subject to any disclaimer, the term of this patent is extended or adjusted under 35 U.S.C. 154(b) by 387 days.

(21) Appl. No.: 15/043,315

(22) Filed: Feb. 12, 2016

(65) Prior Publication Data
US 2017/0237271 A1    Aug. 17, 2017

(51) Int. Cl.
*H02J 7/00* (2006.01)
*H01G 9/00* (2006.01)
(Continued)

(52) U.S. Cl.
CPC ............ *H02J 7/0026* (2013.01); *H01G 9/00* (2013.01); *H02J 1/102* (2013.01); *H02J 7/007* (2013.01); *H02J 7/0018* (2013.01); *H02J 7/0045* (2013.01); *H02J 7/0065* (2013.01); *H02J 7/0077* (2013.01); *H02J 7/345* (2013.01); *H02J 2001/104* (2013.01); *H02J 2007/0059* (2013.01); *H02J 2007/0067* (2013.01)

(58) Field of Classification Search
CPC ........ H02J 7/007; H02J 7/0026; H02J 7/0045; H02J 7/345
USPC ........................................................ 320/166
See application file for complete search history.

(56) References Cited

U.S. PATENT DOCUMENTS 3,407,394 A    10/1968   Hartke
4,694,377 A     9/1987   MacDougall et al.
(Continued)

FOREIGN PATENT DOCUMENTS

CA    2074848 A1    2/1998
CN    1582506 A     2/2005
(Continued)

OTHER PUBLICATIONS

International Search Report and Written Opinion for International Application No. PCT/US2016/033628, dated Sep. 1, 2016.
(Continued)

*Primary Examiner* — Richard Isla
*Assistant Examiner* — Johali A Torres Ruiz
(74) *Attorney, Agent, or Firm* — JDI Patent; Joshua D. Isenberg; Robert Pullman

(57) ABSTRACT

The present disclosure provides an energy storage cell comprising at least one capacitive energy storage device and a DC-voltage conversion device. The capacitive energy storage device comprises at least one meta-capacitor. The output voltage of the capacitive energy storage device is the input voltage of the DC-voltage conversion device. The present disclosure also provides a capacitive energy storage module and a capacitive energy storage system.

26 Claims, 27 Drawing Sheets

(51) Int. Cl.
*H02J 1/10* (2006.01)
*H02J 7/34* (2006.01)

(56) References Cited

U.S. PATENT DOCUMENTS

| | | | |
|---|---|---|---|
| 4,702,562 A | 10/1987 | Scheuble et al. | |
| 1,894,186 A | 1/1990 | Gordon et al. | |
| 5,141,837 A | 8/1992 | Nguyen et al. | |
| 5,187,639 A | 2/1993 | Ogawa et al. | |
| 5,248,774 A | 9/1993 | Dietz et al. | |
| 5,312,896 A | 5/1994 | Bhardwaj et al. | |
| 5,384,521 A | 1/1995 | Coe | |
| 5,395,556 A | 3/1995 | Drost et al. | |
| 5,466,807 A | 11/1995 | Dietz et al. | |
| 5,514,799 A | 5/1996 | Varanasi et al. | |
| 5,581,437 A | 12/1996 | Sebillotte et al. | |
| 5,583,359 A | 12/1996 | Ng et al. | |
| 5,597,661 A | 1/1997 | Takeuchi et al. | |
| 5,642,270 A | 6/1997 | Green et al. | |
| 5,679,763 A | 10/1997 | Jen et al. | |
| 5,680,908 A | 10/1997 | Reed | |
| 5,742,471 A | 4/1998 | Barbee et al. | |
| 5,840,906 A | 11/1998 | Zoltewicz et al. | |
| 5,880,951 A | 3/1999 | Inaba | |
| 6,025,094 A | 2/2000 | Visco et al. | |
| 6,282,081 B1 | 8/2001 | Takabayashi et al. | |
| 6,294,593 B1 | 9/2001 | Jeng et al. | |
| 6,341,056 B1 | 1/2002 | Allman et al. | |
| 6,391,104 B1 | 5/2002 | Schulz | |
| 6,426,861 B1 | 7/2002 | Munshi | |
| 6,501,093 B1 | 12/2002 | Marks | |
| 6,519,136 B1 | 2/2003 | Chu et al. | |
| 6,617,830 B2 | 9/2003 | Nozu et al. | |
| 6,798,642 B2 | 9/2004 | Decker et al. | |
| 7,025,900 B2 | 4/2006 | Sidorenko et al. | |
| 7,033,406 B2 | 4/2006 | Weir et al. | |
| 7,211,824 B2 | 5/2007 | Lazarev | |
| 7,342,755 B1 | 3/2008 | Horvat et al. | |
| 7,460,352 B2 | 12/2008 | Jamison et al. | |
| 7,466,536 B1 | 12/2008 | Weir et al. | |
| 7,498,689 B2 | 3/2009 | Mitani et al. | |
| 7,579,709 B2 | 8/2009 | Goetz et al. | |
| 7,625,497 B2 | 12/2009 | Iverson et al. | |
| 7,654,352 B2 | 2/2010 | Takasaki et al. | |
| 7,795,431 B2 | 9/2010 | Pschirer et al. | |
| 7,808,771 B2 | 10/2010 | Nguyen et al. | |
| 7,837,902 B2 | 11/2010 | Hsu et al. | |
| 7,893,265 B2 | 2/2011 | Facchetti et al. | |
| 7,910,736 B2 | 3/2011 | Koenemann et al. | |
| 7,939,969 B2 | 5/2011 | Ichikawa et al. | |
| 7,947,199 B2 | 5/2011 | Wessling | |
| 7,990,679 B2 | 8/2011 | Ehrenberg et al. | |
| 8,089,177 B2 | 1/2012 | Kato | |
| 8,143,853 B2 | 3/2012 | Jestin et al. | |
| 8,222,074 B2 | 7/2012 | Lazarev | |
| 8,231,809 B2 | 7/2012 | Pschirer et al. | |
| 8,236,998 B2 | 8/2012 | Nagata et al. | |
| 8,288,995 B2 | 10/2012 | Jimbo et al. | |
| 8,344,142 B2 | 1/2013 | Marder et al. | |
| 8,372,527 B2 | 2/2013 | Morishita et al. | |
| 8,404,844 B2 | 3/2013 | Kastler et al. | |
| 8,410,634 B2 | 4/2013 | Park | |
| 8,527,126 B2 | 9/2013 | Yamamoto et al. | |
| 8,552,179 B2 | 10/2013 | Lazarev | |
| 8,766,566 B2 | 7/2014 | Baba et al. | |
| 8,793,041 B2 | 7/2014 | Yamamoto et al. | |
| 8,818,601 B1 | 8/2014 | V et al. | |
| 8,831,805 B2 | 9/2014 | Izumi et al. | |
| 8,929,054 B2 | 1/2015 | Felten et al. | |
| 8,938,160 B2 | 1/2015 | Wang | |
| 9,056,676 B1 | 6/2015 | Wang | |
| 2002/0027220 A1 | 3/2002 | Wang et al. | |
| 2002/0048140 A1 | 4/2002 | Gallay et al. | |
| 2003/0026063 A1 | 2/2003 | Munshi | |
| 2003/0102502 A1 | 6/2003 | Togashi | |
| 2003/0103319 A1 | 6/2003 | Kumar et al. | |
| 2003/0105365 A1 | 6/2003 | Smith et al. | |
| 2003/0142461 A1 | 7/2003 | Decker et al. | |
| 2003/0160595 A1 | 8/2003 | Provanzana et al. | |
| 2003/0219647 A1 | 11/2003 | Wariishi | |
| 2004/0173873 A1 | 9/2004 | Kumar et al. | |
| 2004/0222413 A1 | 11/2004 | Hsu et al. | |
| 2004/0223291 A1 | 11/2004 | Naito et al. | |
| 2005/0118083 A1 | 6/2005 | Tabuchi | |
| 2006/0120014 A1 | 6/2006 | Nakamura et al. | |
| 2006/0120020 A1* | 6/2006 | Dowgiallo, Jr. | H01G 4/12 361/313 |
| 2007/0001258 A1 | 1/2007 | Aihara | |
| 2007/0003781 A1* | 1/2007 | de Rochemont | B82Y 30/00 428/615 |
| 2007/0007939 A1 | 1/2007 | Miller et al. | |
| 2007/0108940 A1 | 5/2007 | Sainomoto et al. | |
| 2007/0159767 A1 | 7/2007 | Jamison et al. | |
| 2007/0181973 A1 | 8/2007 | Hung et al. | |
| 2008/0002329 A1 | 1/2008 | Pohm et al. | |
| 2008/0150484 A1* | 6/2008 | Kimball | H02J 7/34 320/125 |
| 2008/0266750 A1 | 10/2008 | Wu et al. | |
| 2008/0283283 A1 | 11/2008 | Abe et al. | |
| 2009/0040685 A1 | 2/2009 | Hiemer et al. | |
| 2009/0184355 A1 | 7/2009 | Brederlow et al. | |
| 2010/0038629 A1 | 2/2010 | Lazarev | |
| 2010/0085521 A1 | 4/2010 | Kasianova et al. | |
| 2010/0178728 A1 | 7/2010 | Zheng et al. | |
| 2010/0183919 A1 | 7/2010 | Holme et al. | |
| 2010/0193777 A1 | 8/2010 | Takahashi et al. | |
| 2010/0214719 A1 | 8/2010 | Kim et al. | |
| 2010/0233491 A1 | 9/2010 | Nokel et al. | |
| 2010/0255381 A1 | 10/2010 | Holme et al. | |
| 2010/0269731 A1* | 10/2010 | Tofte Jespersen | B01J 13/0091 106/18.32 |
| 2010/0309606 A1 | 12/2010 | Allers et al. | |
| 2010/0309696 A1 | 12/2010 | Guillot et al. | |
| 2010/0315043 A1* | 12/2010 | Chau | B60L 3/0046 320/134 |
| 2011/0006393 A1 | 1/2011 | Cui | |
| 2011/0042649 A1 | 2/2011 | Duvall et al. | |
| 2011/0079733 A1 | 4/2011 | Langhals et al. | |
| 2011/0079773 A1 | 4/2011 | Wasielewski et al. | |
| 2011/0110015 A1 | 5/2011 | Zhang et al. | |
| 2011/0228442 A1 | 9/2011 | Zhang et al. | |
| 2012/0008251 A1 | 1/2012 | Yu et al. | |
| 2012/0033342 A1 | 2/2012 | Ito et al. | |
| 2012/0053288 A1 | 3/2012 | Morishita et al. | |
| 2012/0056600 A1 | 3/2012 | Nevin | |
| 2012/0059307 A1 | 3/2012 | Harris et al. | |
| 2012/0113380 A1 | 5/2012 | Geivandov et al. | |
| 2012/0122274 A1 | 5/2012 | Lazarev | |
| 2012/0244330 A1 | 9/2012 | Sun et al. | |
| 2012/0268862 A1 | 10/2012 | Song et al. | |
| 2012/0274145 A1* | 11/2012 | Taddeo | H02J 1/12 307/82 |
| 2012/0302489 A1 | 11/2012 | Rodrigues et al. | |
| 2013/0056720 A1 | 3/2013 | Kim et al. | |
| 2013/0187475 A1* | 7/2013 | Vendik | H01F 38/14 307/104 |
| 2013/0194716 A1 | 8/2013 | Holme et al. | |
| 2013/0215535 A1 | 8/2013 | Bellomo | |
| 2013/0224473 A1 | 8/2013 | Tassell et al. | |
| 2013/0314839 A1 | 11/2013 | Terashima et al. | |
| 2013/0342967 A1 | 12/2013 | Lai et al. | |
| 2014/0035100 A1 | 2/2014 | Cho | |
| 2014/0036410 A1 | 2/2014 | Okamatsu et al. | |
| 2014/0098458 A1 | 4/2014 | Almadhoun et al. | |
| 2014/0158340 A1* | 6/2014 | Dixler | F28F 27/00 165/287 |
| 2014/0169104 A1 | 6/2014 | Kan et al. | |
| 2014/0185260 A1 | 7/2014 | Chen et al. | |
| 2014/0268490 A1 | 9/2014 | Tsai et al. | |
| 2014/0316387 A1 | 10/2014 | Harris et al. | |
| 2014/0347787 A1 | 11/2014 | Fathi et al. | |
| 2015/0008671 A1 | 1/2015 | Rentero et al. | |
| 2015/0008735 A1 | 1/2015 | Mizoguchi | |

(56) References Cited

U.S. PATENT DOCUMENTS

| | | | |
|---|---|---|---|
| 2015/0158392 A1 | 6/2015 | Zhao | |
| 2015/0162131 A1 | 6/2015 | Felten et al. | |
| 2015/0235769 A1* | 8/2015 | Carver | H01G 4/33 361/303 |
| 2015/0249401 A1* | 9/2015 | Eriksen | H02M 5/4585 290/44 |
| 2015/0302990 A1 | 10/2015 | Ghosh et al. | |
| 2016/0001662 A1 | 1/2016 | Miller et al. | |
| 2016/0020026 A1 | 1/2016 | Lazarev | |
| 2016/0020027 A1 | 1/2016 | Lazarev | |
| 2016/0229411 A1 | 8/2016 | Murata | |
| 2016/0254092 A1 | 9/2016 | Lazarev et al. | |
| 2016/0314901 A1 | 10/2016 | Lazarev | |
| 2016/0340368 A1 | 11/2016 | Lazarev | |
| 2016/0379757 A1 | 12/2016 | Robinson et al. | |
| 2017/0232853 A1 | 8/2017 | Lazarev et al. | |
| 2017/0236641 A1 | 8/2017 | Furuta et al. | |
| 2017/0236642 A1 | 8/2017 | Furuta et al. | |
| 2017/0301467 A1 | 10/2017 | Lazarev et al. | |
| 2018/0061582 A1 | 3/2018 | Furuta et al. | |
| 2018/0122143 A1 | 5/2018 | Ellwood | |
| 2018/0126857 A1 | 5/2018 | Kelly-Morgan | |
| 2018/0137978 A1 | 5/2018 | Hein et al. | |
| 2018/0137984 A1 | 5/2018 | Furuta et al. | |

FOREIGN PATENT DOCUMENTS

| | | |
|---|---|---|
| CN | 100449661 | 1/2009 |
| CN | 1748271 B | 6/2010 |
| CN | 102426918 A | 4/2012 |
| CN | 203118781 U | 8/2013 |
| CN | 203377785 U | 1/2014 |
| CN | 103755703 A | 4/2014 |
| CN | 103986224 A | 8/2014 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0986080 A3 | 1/2004 |
| EP | 0865142 B1 | 5/2008 |
| EP | 2062944 A1 | 5/2009 |
| EP | 2415543 A1 | 2/2012 |
| EP | 1486590 B1 | 12/2013 |
| EP | 2759480 A1 | 7/2014 |
| GB | 547853 A | 9/1942 |
| GB | 923148 A | 4/1963 |
| GB | 2084585 B | 11/1983 |
| JP | S6386731 A | 4/1988 |
| JP | 2786298 B2 | 11/1991 |
| JP | H03253014 A | 11/1991 |
| JP | 2786298 B2 | 8/1998 |
| JP | 2000100484 A | 4/2000 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |
| RU | 2199450 C1 | 2/2003 |
| RU | 2512880 C2 | 4/2014 |
| WO | 1990009616 A1 | 8/1990 |
| WO | 0139305 A1 | 5/2001 |
| WO | 2002026774 A2 | 4/2002 |
| WO | 2007078916 A2 | 7/2007 |
| WO | 2008038047 A2 | 4/2008 |
| WO | 2009158553 A2 | 12/2009 |
| WO | 2011056903 A1 | 5/2011 |
| WO | 2012012672 A2 | 1/2012 |
| WO | 2012084536 A1 | 6/2012 |
| WO | 2012122312 A1 | 9/2012 |
| WO | 2012162500 A2 | 11/2012 |
| WO | 2013009772 A1 | 1/2013 |
| WO | 2013085467 A1 | 6/2013 |
| WO | 2013085467 B | 6/2013 |
| WO | 2014009686 A1 | 1/2014 |
| WO | 2015003725 A1 | 1/2015 |
| WO | 2015175522 A1 | 11/2015 |

OTHER PUBLICATIONS

International Search Report and Written Opinion for International Application No. PCT/US2016/039395, dated Oct. 11, 2016.

Non-Final Office Action for U.S. Appl. No. 14/751,600, dated Jan. 23, 2017.

Non-Final Office Action for U.S. Appl. No. 14/919,337, dated Jan. 4, 2017.

Notice of Allowance for U.S. Appl. No. 14/710,491, dated Oct. 24, 2016.

Center for Dielectric Studies, Janosik, et al., "Ultra-High Energy Density Capacitors Through Improved Glass Technology", pp. 1-5 Center for Dielectric Studies Penn State University, dated 2004.

Congressional Research Service, Paul W. Parfomak, "Energy Storage for Power Grids and Electric Transportation: A Technology Assessment", pp. 87-94; Members and Committees of Congress; Mar. 27, 2012.

Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.

Department of Chemistry, HO et al., "High dielectric constant polyanilinelpoly(acrylic acid) composites prepared by in situ polymerization", pp. 630-637; National Taiwan University, Taipei, Taiwan, ROC, Apr. 15, 2008.

Hindawi Publishing Corporation, Chavez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.

Hindawi Publishing Corporation, Gonzalez-Espasandin et al., "Fuel Cells: A Real Option for Unmanned Aerial Vehicles Propulsion", pp. 1-13, Torrefon de Ardoz, 28850 Madrid, Spain Jan. 30, 2014.

Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.

Institute of Transportation Studies, Burke, et al. "Review of the Present and Future Applications of Supercapacitors in Electric and Hybrid Vehicles", pp. 2-23 UC Davis ITS; Dec. 2014.

International Search Report and Written Opinion for International Application No. PCT/US2015/058890, dated Feb. 25, 2016.

International Search Report and Written Opinion for International Application No. PCT/US2015/030356, dated Jul. 28, 2015.

International Search Report and Written Opinion for International Application No. PCT/US2015/030415, dated Nov. 4, 2015.

International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.

JACS Articles, Kang et. al., "Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.

Yue Wang, et. al., "Morphological and Dimensional Control via Hierarchical Assembly of Doped Oligoaniline Single Crystals", J. Am. Chem. Soc. 2012, 134, pp. 9251-9262.

Microelectronics Research and Communications Institute, Founders et al., "High-Voltage Switching Circuit for Manometer Scale CMOS Technologies", pp. 1-4, University of Idaho, Moscow, ID 83843 USA, Apr. 30, 2007.

(56) References Cited

OTHER PUBLICATIONS

Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.

Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.

Philosophical Transactions of the Royal Society, SIMON, "Charge storage mechanism in nanoporous carbons and its consequence for electrical double layer capacitors" pp. 3457-3467; Drexel University, Philadelphia, PA 19104, 2010.

R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.

RSC Publishing, Akl et al., "Molecular materials for switchable nonlinear optics in the solid state, based on ruthenium-nitrosyl complexes", pp. 3518-3527, Porto Alegre, Brazil; May 24, 2013.

U.S. Appl. No. 15/053,943, to Pavel Ivan Lazarev, et al., filed Mar. 14, 2016.

U.S. Appl. No. 15/090,509, to Pavel Ivan Lazarev, et al., filed Mar. 4, 2016.

U.S. Appl. No. 14/752,600, to Matthew R. Robinson, et al., filed Jun. 26, 2015.

U.S. Appl. No. 14/919,337, to Paul T. Furuta, et al., filed Oct. 21, 2015.

U.S. Appl. No. 14/931,757, to Pavel Ivan Lazarev, et al., filed Nov. 3, 2015.

U.S. Appl. No. 15/043,186, to Paul T. Furuta, et al., filed Feb. 12, 2016.

U.S. Appl. No. 15/043,209, to Paul T. Furuta, et al., filed Feb. 12, 2016.

U.S. Appl. No. 15/043,247, to Barry K Sharp, et al., filed Feb. 12, 2016.

U.S. Appl. No. 14/719,072, to Pavel Ivan Lazarev, filed May 21, 2015.

U.S. Appl. No. 15/043,315, to Ivan S.G. Kelley-Morgan, filed Feb. 12, 2016.

U.S. Appl. No. 62/318,134, to Pavel Ivan Lazarev, et al., filed Mar. 4, 2016.

U.S. Appl. No. 62/294,964, to Pavel Ivan Lazarev, et al., filed Feb. 12, 2016.

U.S. Appl. No. 62/121,328, to Pavel Ivan Lazarev et al., filed Feb. 26, 2015.

U.S. Appl. No. 62/294,949, to Pavel Ivan Lazarev, et al., filed Feb. 12, 2016.

U.S. Appl. No. 62/294,955, to Pavel Ivan Lazarev, et al., filed Feb. 2, 2016.

Final Office Action for U.S. Appl. No. 14/919,337, dated May 1, 2017.

Henna Ruuska et al., "A Density Functional Study on Dielectric Properties of Acrylic Acid Crafted Polypropylene", The Journal of Chemical Physics, vol. 134, p. 134904 (2011).

International Search Report and Written Opinion for International Application No. PCT/US2017/017146, dated May 11, 2017.

Non-Final Office Action for U.S. Appl. No. 15/053,943, dated Apr. 19, 2017.

Pubchem Open Chemistry Database, Compound Summary for CID 91001799. Mar. 17, 2015. pp. 1-10.

Roger D. Hartman and Herbert A. Pohl, "Hyper-electronic Polarization in Macromolecular Solids", Journal of Polymer Science: Part A-1, vol. 6, pp. 1135-1152 (1968).

International Search Report and Written Opinion for International Application No. PCT/US2017/017150, dated May 18, 2017.

International Search Report and Written Opinion dated Jul. 31, 2017 for International Patent Application PCT/US2017/024589.

International Search Report and Written Opinion dated Feb. 23, 2018 for International Patent Application No. PCT/US17/64252.

International Search Report and Written Opinion dated June 7, 2017 for International Application No. PCT/US2017/24589, to Pavel Ivan Lazarev, filed Jun. 7, 2017.

Non-Final Action for U.S. Appl. No. 15/043,186, dated Feb. 14, 2018.

Non-Final/Final Office Action for U.S. Appl. No. 15/043,247, dated Feb. 20, 2018.

Notice of Allowance for U.S. Appl. No. 14/719,072, dated Nov. 16, 2017.

Notice of Allowance for U.S. Appl. No. 14/919,337, dated Mar. 5, 2018.

Notice of Allowance for U.S. Appl. No. 14/931,757, dated Feb. 8, 2018.

Office Action dated Jan. 25, 2018 for Chinese patent application No. 20158005146.4.

Search Report and Written Opinion dated Feb. 7, 2018 for Singapore Patent Application No. 11201609435W.

D C Tiwari, et al: "Temperature dependent studies of electric and dielectric properties of polythiophene based nano composite", Indian Journal of Pure & Applied Physicsvol. 50, Jan. 2012. pp. 49-56.

Extended European Search Report . 15792494.5, dated Dec. 11, 2017.

Extended European Search Report for Application No. 15792405.1, dated Nov. 10, 2017.

Final Office Action for U.S. Appl. No. 15/043,249, dated Feb. 6,2018.

Final Office Action for U.S. Appl. No. 15/194,224, dated Jan. 30, 2018.

Non-Final Office Action for U.S. Appl. No. 15/090,509, dated Jun. 22, 2017.

Non-Final Office Action for U.S. Appl. No. 15/163,595, dated Jan. 17, 2018.

Notice of Allowance for U.S. Appl. No. 14/710,480, dated Nov. 24, 2017.

Notice of Allowance for U.S. Appl. No. 14/710,480, dated Jan. 11, 2018.

Notice of Allowance for U.S. Appl. No. 14/752,600, dated Nov. 24, 2017.

Notice of Allowance for U.S. Appl. No. 14/752,600, dated Dec. 4, 2017.

Notice of Allowance for U.S. Appl. No. 14/919,337, dated Nov. 8, 2017.

Notice of Allowance for U.S. Appl. No. 14/931,757, dated Dec. 29, 2017.

Notice of Allowance for U.S. Appl. No. 15/090,509, dated Jan. 24, 2018.

Office Action dated Dec. 13, 2017 for Taiwan Patent Application No. 106104499.

Office Action dated Dec. 13, 2017 for Taiwan Patent Application No. 106104500.

Updated Notice of Allowance for U.S. Appl. No. 14/710,480, dated Jan. 17, 2018.

Non-Final Office Action for U.S. Appl. No. 15/043,247, dated Jun. 7, 2018.

Non-Final Office Action for U.S. Appl. No. 15/449,587, dated May 21, 2018.

Non-Final Office Action for U.S. Appl. No. 15/710,587, dated Jul. 3, 2018.

Non-Final Office Action for U.S. Appl. No. 15/805,016, dated Jun. 4, 2018.

Office Action dated May 18, 2018 for Chinese Patent Application for Invention Na 201580025110.

Deily, Dielectric and Optical Characterization of Polar Polymeric Materials: Chromophore Entrained PMMA Thin Films, Thesis, 2008.

Deruiter, J. Resonance and Induction Tutorial. Auburn University-Principles of Drug Action 1 Course Material. Spring 2005, 19 pages.

Final Office Action for U.S. Appl. No. 15/043,247, dated Oct. 4, 2017.

Handy, Scott T. "Ionic Liquids—Classes and Properties" Published Sep. 2011, Accessed Aug. 28, 2017, InTechweb.org.

(56) References Cited

OTHER PUBLICATIONS

Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.

Hsing-Yang Tsai et al, "Synthesis and optical properties of novel asyn1metric perylene bisimides", Journal of Luminescence, Vole 149, pp. 103-111 (2014).

International Search Report and Written Opinion for International Application No. PCT/US2016/019641, dated Jul. 12, 2016.

International Search Report and Written Opinion for International Application No. PCT/US2016/57765, dated Jan. 5, 2017.

International Search Report and Written Opinion for International Application No. PCT/US2017/016862, dated Aug. 14, 2017.

International Search Report and Written Opinion for International Application No. PCT/US2017/24150, dated Jun. 21, 2017.

International Search Report and Written Opinion for International Application No. PCT/US2017/24371, dated Aug. 2, 2017.

International Search Report and Written Opinion for International Application No. PCT/US2017/24600, dated Aug. 14, 2017.

Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.

Johnson, Kieth E. "What's an Ionic Liquid?" The Electrochemical Society Interface, Published Spring 2007, pp. 38-41, Accessed Aug. 28 2017.

Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.

Liang, Mao et al. "Synthesis and Photovoltaic Performance of Two Triarylamine Organic Dyes Based on Truxene." Yinyong Huaxue (2011) vol. 28 No. 12, pp. 1387-1392.

Lu, Meng et al. "Organic Dyes Incorporating Bis-hexapropyt-truxeneamino Moiety for efficient Dye-sensitized Solar Cells." Journal of Physical Chemistry C (2011) vol. 115, No. 1, pp. 274-281.

Maddalena, Francesco "Why are Ionic Liquids, Liquids?" http://www.quora.com/why-are-ionic-liquids-liquids?, Published Jan. 26, 2017, Accessed Aug. 28, 2017.

Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.

Manukian, BK. 216. IR.-spektroskopische Untersuchungen in der Imidazol-Reihe. Helvetica Chimica Acta. 1965, vol. 48, p. 2001.

Nagabrahmandachari et al. "Synthesis and Spectral Analysis of Tin Tetracarboxylates and Phosphinates" Indian Journal of Chemistry—Section A, 1995, vol. 34A, pp. 658-660.

Ni, Hai-Lang et al. "Truxene Discotic Liquid Crystals with Two Different Ring Substituents: Synthesis, Metamorphosis and High Charged Carrier Mobility ." Liquid Crystals, vol. 40, No. 3, pp. 411-420.

Non-Final Office Action dated Jun. 13, 2017 for U.S. Appl. No. 15/163,595.

Non-Final Office Action for U.S. Appl. No. 14/719,072, dated Aug. 2, 2017.

Non-Final Office Action for U.S. Appl. No. 15/043,247, dated Jun. 22, 2017.

Trevethan, Thomas et al. "Organic Molecules Reconstruct Nanostructures on Ionic Surfaces." Small (2011), vol. 7, No. 9, pp. 1264-1270.

Non-Final Office Action for U.S. Appl. No. 15/194,224, dated Sep. 27, 2017.

Non-Final Office Action for U.S. Appl. No. 14/710,480, dated May 8, 2017.

Non-Final Office Action for U.S. Appl. No. 15/043,186, dated Jun. 2, 2017.

Notice of Allowance for U.S. Appl. No. 14/710,480, dated Oct. 6, 2017.

Notice of Allowance for U.S. Appl. No. 14/752,600, dated Jul. 27, 2017.

Notice of Allowance for U.S. Appl. No. 14/919,337, dated Jul. 19, 2017.

Notice of Allowance for U.S. Appl. No. 14/931,757, dated Jul. 17, 2017.

Notice of Allowance for U.S. Appl. No. 14/931,757, dated Oct. 31, 2017.

Notice of Allowance for U.S. Appl. No. 15/053,943, dated Aug. 14, 2017.

Office Action dated Oct. 19, 2017 for Taiwan patent Application No. 106104501.

Notice of Allowance for U.S. Appl. No. 15/710,587, dated Jan. 24, 2019.

Office Action dated Jan. 29, 2019 for Japenese Patent Application No. 2017-512654.

Notice of Allowance dated Feb. 21, 2019 for U.S. Appl. No. 15/449,524.

Notice of Allowance dated Feb. 25, 2019 for U.S. Appl. No. 15/872,752.

Non-Final Office Action dated Feb. 27, 2019 for U.S. Appl. No. 15/870,504.

* cited by examiner

ENERGY STORAGE CELL, CAPACITIVE ENERGY STORAGE MODULE, AND CAPACITIVE ENERGY STORAGE SYSTEM

FIELD OF THE DISCLOSURE

The present disclosure relates generally to a modular energy storage system to simultaneously enable multiple applications and more particularly to an energy storage cell comprising at least one capacitive energy storage device and a DC-voltage conversion device.

BACKGROUND

Many technical applications can benefit from rechargeable electrical energy storage. Most rechargeable electrical energy storage systems are based on rechargeable batteries. Rechargeable batteries store and release electrical energy through electrochemical reactions. Rechargeable batteries are used for automobile starters, portable consumer devices, light vehicles (such as motorized wheelchairs, golf carts, electric bicycles, and electric forklifts), tools, and uninterruptible power supplies. Emerging applications in hybrid internal combustion-battery and electric vehicles are driving the technology to reduce cost, weight, and size, and increase lifetime. Grid energy storage applications use rechargeable batteries for load-leveling, storing electric energy at times of low demand for use during peak periods, and for renewable energy uses, such as storing power generated from photovoltaic arrays during the day to be used at night. Load-leveling reduces the maximum power which a plant must be able to generate, reducing capital cost and the need for peaking power plants. Small rechargeable batteries are used to power portable electronic devices, power tools, appliances, and so on. Heavy-duty batteries are used to power electric vehicles, ranging from scooters to locomotives and ships. Rechargeable batteries are also used in distributed electricity generation and stand-alone power systems. Such applications often use rechargeable batteries in conjunction with a battery management system (BMS) that monitors battery parameters such as voltage, current, temperature, state of charge, and state of discharge and protects against operating the battery outside its safe operating area. Rechargeable batteries have drawbacks due to relatively large weight per unit energy stored, a tendency to self-discharge, susceptibility to damage if too deeply discharged, susceptibility to catastrophic failure if charged too deeply, limited power availability per unit weight, limited power availability per unit energy, relatively long charging times, and degradation of storage capacity as the number of charge-discharge cycles increases.

Alternatives to batteries for rechargeable energy storage include capacitor-based systems. Capacitors store energy in the form of an electrostatic field between a pair of electrodes separated by a dielectric layer. When a voltage is applied between two electrodes, an electric field is present in the dielectric layer. Unlike batteries, capacitors can be charged relatively quickly, can be deeply discharged without suffering damage, and can undergo a large number of charge discharge cycles without damage. Capacitors are also lower in weight than comparable batteries. Despite improvements in capacitor technology, including the development of ultracapacitors and supercapacitors, rechargeable batteries store more energy per unit volume. One drawback of capacitors compared to batteries is that the terminal voltage drops rapidly during discharge. By contrast, battery systems tend to have a terminal voltage that does not decline rapidly until nearly exhausted. Also, because the energy stored on a capacitor increases with the square of the voltage for linear dielectrics and at a power greater-than or equal to 2 for meta-dielectrics, capacitors for energy storage applications typically operate at much higher voltages than batteries. Furthermore, energy is lost if constant current mode is not used during charge and discharge. These characteristics complicate the design of power electronics for use with meta-capacitors and differentiate the meta-capacitor management system from battery management systems that are presently in use It is within this context that aspects of the present disclosure arise.

INTRODUCTION

Aspects of the present disclosure address problems with conventional rechargeable electrical energy storage technology by combining a capacitive energy storage device having one or meta-capacitors with a DC-voltage conversion device having one or more switch mode voltage converters coupled to the terminals of the capacitive energy storage device. Meta-capacitors have greater energy storage capacity than conventional ultracapacitors or supercapacitors. The DC-voltage conversion device regulates the voltage on the capacitive energy storage device during charging and discharging.

A voltage conversion device typically includes a voltage source (an input), one or more active or passively controlled switches, one or more inductive elements (some advanced converters, e.g., charge-pump circuits, do not specifically use inductors per se though there may be parasitic inductance in the circuit board and/or wiring), one or more energy storage elements (e.g., capacitors and/or inductors), some way of sensing output voltage and/or current, and some way of controlling the switches to create a specific output voltage or current, and terminals to connect this device to external inputs and outputs such as various loads. A standard circuit for producing an output voltage $V_{out}$ that is less than the input voltage $V_{in}$ ($V_{out}/V_{in}<1$) is called a buck converter, and a standard circuit for producing an output voltage that is greater than the input voltage ($V_{out}/V_{in}>1$) is called a boost converter. The basic circuit often used to describe buck conversion is a switched LC filter (FIG. 1). The load can be thought of as a resistor that will vary its resistance to achieve a set current moving through it. Effectively, this is an LCR low-pass filter, with the capacitor and resistor in parallel. When the switch is closed, the LC network begins to absorb energy, and current begins to flow through the inductor. However, when the switch is opened while current is flowing, the inductor will attempt to maintain the current i(t) and will generate reverse voltage v(t) following equation (1).

$$v(t) = L\frac{di(t)}{dt}, \qquad (1)$$

The reverse voltage generated will be extremely high if the incremental change in current di occurs over a sufficiently short increment of time dt, and this may damage or destroy the switching element SW1. Therefore, it is necessary to provide a path to ground so that current can continue to flow. This path can be implemented with a diode that operates as a one-way valve, opening automatically when the inductor tries to pull current out of the switching element SW1 (see FIG. 2). This is called a non-synchronous buck converter, because the diode is automatically synchronized with the switching of a power transistor, such as a metal oxide semiconductor field effect transistor (MOSFET). Such a converter does not need to be actively synchronized. A possible issue with this type of circuit is that the turn-on voltage of the diode needs to be reached and be maintained while the switching element SW1 is turned off and the diode is active. This means that there will always be a voltage drop of, e.g., ~0.6V across the diode due to current flowing through it, and therefore a power loss. This can be improved by implementing a synchronous converter design, where the diode is replaced with a second switch SW2 (see FIG. 3) and the controller actively synchronizes the activity of both switches such that they are never on at the same time.

The delay between turn-off and turn-on of the MOSFETs in a synchronous design needs to ensure that a shoot-through event does not occur. Although two separate pulses can be set up with a delay, a better solution would only need a single PWM channel set up and automatically derive the second signal. With a little bit of thought, this can be achieved using digital buffers (or inverters) to introduce a time delay into the switching signals applied to the switches SW1 and SW2 shown in FIG. 3. Typical gates have 2-10 ns propagation delay, but programmable logic devices such as a complex programmable logic device (CPLD) or field programmable gate array (FPGA) can be programmed with variable propagation delay. FIG. 4 demonstrates the signal treatment required to generate a pair of signals, S' and !S&&!S" correspondingly to switches SW1, SW2 with the required time delay spacing, with the only inputs being a pulse-width modulated signal, S, and a time delay, $t_{delay}$. $S'(t)=S(t+t_{delay})$ and $S''(t)=S(t+2*t_{delay})$. In FIG. 4, it is assumed that a switch is "closed", i.e., conducting, when the switching signal is high and "open", i.e., non-conducting when the switching signal is low. In FIG. 4, S is an input PWM input signal. S' is the input signal S delayed by $t_{delay}$. S" is S' delayed by 2*tdelay, !S is the inverse of the input signal S, !S" is the inverse of signal S", and !S&&!S" is the logical AND of !S with !S".

When deciding between synchronous or non-synchronous it is important to consider the efficiency losses due to switching (e.g., energy needed to move charge on and off the gate of a MOSFET) and those due to conduction through the diode. Synchronous converters tend to have an advantage in high-ratio conversion. They are also a fundamental building block of the split-pi-bidirectional converter because the extra switches are needed to provide dual-purpose buck or boost.

In the off-state, the boost converter delivers the supply voltage directly to the load through the second switch element SW2 in FIG. 5. The process of increasing the voltage to the load is started by opening the switching element SW2 and closing the switching element SW1 (FIG. 6). Due to the additional voltage drop on inductor L1, current flowing through inductor L1 will increase over time (see, equation (2)).

$$i(t) - i(t_0) = \frac{1}{L1} \int_{t_0}^{t} v(t)dt, \qquad (2)$$

When the circuit is returned to the "OFF" state, the inductor will attempt to maintain the same current that it had before by increasing its voltage drop proportional to the change in current (see, equation (3)).

$$v(t) = L1 \frac{di(t)}{dt}, \qquad (3)$$

In the "off state" the switching element SW2 is closed so that this increased voltage gets translated to the output capacitor. The output capacitor provides filtering; averaging between $V_{in}$ and the inductor's voltage spikes.

N-channel MOSFET (NMOS), P-channel MOSFET (PMOS), and push-pull complementary metal oxide semiconductor (CMOS) topologies of a stacked MOSFET for fully integrated implementations in Honeywell's 150 nm SOI Radiation Hardened process described in following paper (Jennifer E et al., "High-Voltage Switching Circuit for Nanometer Scale CMOS Technologies" Manuscript received Apr. 30, 2007), which is incorporated herein by reference. The stacked MOSFET is a high-voltage switching circuit. A low-voltage input signal turns on the first MOSFET in a stack of MOSFET devices, and the entire stack of devices is turned on by charge injection through parasitic and inserted capacitances. Voltage division provides both static and dynamic voltage balancing, preventing any device in the circuit from exceeding its nominal operating voltage. The design equations for these topologies are presented. Simulations for a five device stack implemented in Honeywell's 150 nm process verify the static and dynamic voltage balancing of the output signal. The simulated stack is shown to handle five times the nominal operating voltage.

An example of a reliable circuit configuration for stacking power metal-oxide semiconductor field effect transistors (MOSFETs) is described, e.g., in R. J. Baker and B. P. Johnson, "Stacking Power MOSFETs for Use in High Speed Instrumentation", Rev. Sci. Instrum., Vol. 63, No. 12, December 1992, pp. 799-801, which is incorporated herein by reference. The resulting circuit has a hold off voltage N times larger than a single power MOSFET, where N is the number of power MOSFETs used. The capability to switch higher voltages and thus greater amounts of power, into a 50 ohm load, in approximately the same time as a single device is realized. Design considerations are presented for selecting a power MOSFET. Using the design method presented, a 1.4 kV pulse generator, into SO 50 ohm, with a 2 ns rise time and negligible jitter is designed.

Another voltage switching circuit configuration is based on an Integrated Gate-Commutated Thyristor (IGCT). The integration of a 10-kV-IGCT and a fast diode in one press pack is an attractive solution for Medium Voltage Converters in a voltage range of 6 kV-7.2 kV if the converter power rating does not exceed about 5-6MVA. (see, Sven Tschirley et al., "Design and Characteristics of Reverse Conducting 10-kV-IGCTs", *Proceedings of the 39th annual Power Electronics Specialist Conference*, pages 92-98, 2008, which is incorporated herein by reference). Tschirley et al describe the design and characterization of the world's first reverse conducting 68 mm 10-kV-IGCTs. On-state-, blocking and switching behavior of different IGCT and diode samples are investigated experimentally. The experimental results clearly show, that 10-kV-RC-IGCTs are an attractive power semiconductor for 6-7.2 kV Medium Voltage Converters.

Capacitors with high volumetric energy density, high operating temperature, low equivalent series resistance (ESR), and long lifetime are critical components for pulse-power, automotive, and industrial electronics. The physical characteristics of the dielectric material in the capacitor are the primary determining factors for the performance of a capacitor. Accordingly, improvements in one or more of the physical properties of the dielectric material in a capacitor can result in corresponding performance improvements in the capacitor component, usually resulting in performance and lifetime enhancements of the electronics system or product in which it is embedded. Since improvements in capacitor dielectric can directly influence product size, product reliability, and product efficiency, there is a high value associated with such improvements.

Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for some applications, for example electric vehicles. Accordingly, it may be an advance in energy storage technology to provide capacitors of higher volumetric and mass energy storage density and lower cost.

SUMMARY

Aspects of the present disclosure address problems with conventional rechargeable electrical energy storage technology by combining a capacitive energy storage device having one or more meta-capacitors (further described below) with a DC-voltage conversion device having one or more switch mode voltage converters coupled to the terminals of the capacitive energy storage device. Meta-capacitors have greater energy storage capacity than conventional ultracapacitors or supercapacitors. The DC-voltage conversion device regulates the voltage on the capacitive energy storage device during charging and discharging.

As used herein, a meta-capacitor is a dielectric film capacitor whose dielectric film is a meta-dielectric material, which is disposed between a first electrode and second electrode. In one embodiment, said electrodes are flat and planar and positioned parallel to each other. In another embodiment, the meta-capacitor comprises two rolled metal electrodes positioned parallel to each other. Additionally, a meta-dielectric material comprises of Sharp polymers and/or Furuta polymers.

The present disclosure provides an energy storage cell comprising a capacitive energy storage device having one or more meta-capacitors and a DC-voltage conversion device having one or more switch mode voltage converters. The power port (consisting of a positive terminal and a negative terminal, or anode and cathode) on the capacitive energy storage device is connected to the capacitor-side power port on the DC-voltage conversion device. The DC-voltage conversion device has one or more other power ports, which may interface to external circuitry. The power ports are intended to convey power with associated current and voltage commiserate to the specification for the cell. Each terminal in the port is a conductive interface. Each cell may include means to monitor and/or control parameters such as voltage, current, temperature, and other important aspects of the DC-voltage conversion device.

In one aspect, a capacitive energy storage module may include one or more individual capacitive energy storage cells and one or more power buses consisting of an interconnection system, wherein a power bus connects the power ports of the individual energy storage cells, in parallel or series, to create common module power ports consisting of common anode(s) and common cathode(s) of the capacitive energy storage module. The module may have additional sensors to monitor temperature, module power, voltage and current of the interconnection system, and may include a communication bus and/or communication bus protocol translator to convey these sensor values as well as the values from the individual cells.

In another aspect, a capacitive energy storage system may include one or more of the aforementioned capacitive energy storage modules, an interconnection system and a system control computer that monitors, processes, and controls all the values on the aforementioned communication bus.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Figure 10:
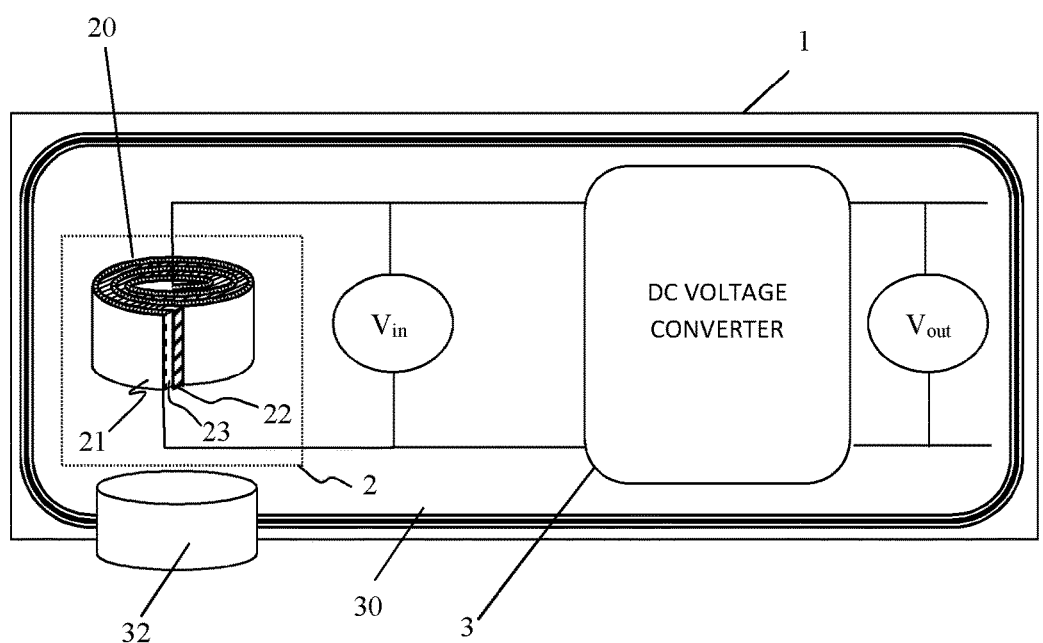
FIG. 10 schematically shows an energy storage cell according to aspects of the present disclosure.

The present disclosure provides an energy storage cell comprising at least one capacitive energy storage device and a DC-voltage conversion device. FIG. 10 schematically shows a capacitive energy storage cell 1 comprising a capacitive energy storage device 2 that includes one or more meta-capacitors 20 and a DC-voltage conversion device 3, consisting of one or more switch-mode voltage converters 100, e.g. a buck converter, boost converter, buck/boost converter, bi-directional buck/boost (split-pi) converter, Ćuk converter, SEPIC converter, inverting buck/boost converter, or four-switch buck/boost converter.

As used herein, a meta-capacitor is a capacitor comprising of a dielectric film that is a meta-dielectric material, which is disposed between a first electrode and second electrode. In one embodiment, said electrodes are flat and planar and positioned parallel to each other. In another embodiment, the meta-capacitor comprises two rolled metal electrodes positioned parallel to each other.

Said meta-dielectric materials are comprised of composite molecules having supra-structures formed from polymers. Examples of said polymers include so-called Sharp polymers and so-called Furuta co-polymers and so-called para-Furuta polymers as described in detail in commonly-assigned U.S. patent application Ser. No. 15/043,247 and Ser. No. 15/043,186, and Ser. No. 15/043,209, respectively, all filed Feb. 12, 2016, the entire contents of which are incorporated herein by reference. Furuta co-polymers and para-Furuta polymers are referred to collectively as Furuta polymers.

Sharp polymers are composites of a polarizable core inside an envelope of hydrocarbon (saturated and/or unsaturated), fluorocarbon, chlorocarbon, siloxane, and/or polyethylene glycol as linear or branched chain oligomers covalently bonded to the polarizable core that act to insulate the polarizable cores from each other, which favorably allows discrete polarization of the cores with limited or no dissipation of the polarization moments in the cores. The polarizable core has hyperelectronic or ionic type polarizability. "Hyperelectronic polarization may be considered due to the pliant interaction of charge pairs of excitons, localized temporarily on long, highly polarizable molecules, with an external electric field [.] (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the core molecular fragment.

A Sharp polymer has a general structural formula:

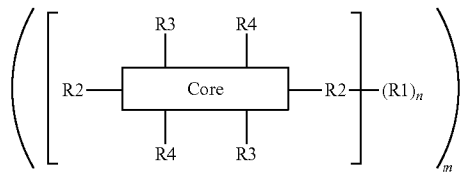

Where Core is an aromatic polycyclic conjugated molecule comprising rylene fragments. This molecule has flat anisometric form and self-assembles by pi-pi stacking in a column-like supramolecule. The substitute R1 provides solubility of the organic compound in a solvent. The parameter n is number of substitutes R1, which is equal to 0, 1, 2, 3, 4, 5, 6, 7 or 8. The substitute R2 is an electrically resistive substitute located in terminal positions, which provides resistivity to electric current and comprises hydrocarbon (saturated and/or unsaturated), fluorocarbon, siloxane, and/or polyethyleneglycol as linear or branched chains. The substitutes R3 and R4 are substitutes located on side (lateral) positions (terminal and/or bay positions) comprising one or more ionic groups from a class of ionic compounds that are used in ionic liquids connected to the aromatic polycyclic conjugated molecule (Core), either directly, e.g., with direct bound SP2-SP3 carbons, or via a connecting group. The parameter m is a number of the aromatic polycyclic conjugated molecules in the column-like supramolecule, which is in a range from 3 to 100 000.

In another embodiment of the composite organic compound, the aromatic polycyclic conjugated molecule comprises an electro-conductive oligomer, such as a phenylene, thiophene, or polyacene quinine radical oligomer or combinations of two or more of these. In yet another embodiment of the composite organic compound, the electro-conductive oligomer is selected from phenylene, thiophene, or substituted and/or unsubstituted polyacene quinine radical oligomer of lengths ranging from 2 to 12. or combination of two or more of these. Wherein the substitutions of ring hydrogens by O, S or NR5, and R5 is selected from the group consisting of unsubstituted or substituted $C_1$-$C_{18}$alkyl, unsubstituted or substituted $C_2$-$C_{18}$alkenyl, unsubstituted or substituted $C_2$-$C_{18}$alkynyl, and unsubstituted or substituted $C_4$-$C_{18}$ aryl.

In some embodiments, the substitute providing solubility (R1) of the composite organic compound is $C_XQ_{2X+1}$, where X≥1 and Q is hydrogen (H), fluorine (F), or chlorine (Cl). In still another embodiment of the composite organic compound, the substitute providing solubility (R1) of the composite organic compound is independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups or siloxane, and/or polyethylene glycol as linear or branched chains.

In some embodiments, at least one electrically resistive substitute (R2) of the composite organic compound is $C_XQ_{2X+1}$, where X≥1 and Q is hydrogen (H), fluorine (F), or chlorine (Cl). In another embodiment of the composite organic compound, at least one electrically resistive substitute (R2) is selected from the list comprising —$(CH_2)_n$—$CH_3$, —$CH((CH_2)_nCH_3)_2$) (where n≥1), alkyl, aryl, substituted alkyl, substituted aryl, branched alkyl, branched aryl, and any combination thereof and wherein the alkyl group is selected from methyl, ethyl, propyl, butyl, iso-butyl and tert-butyl groups, and the aryl group is selected from phenyl, benzyl and naphthyl groups. In yet another embodiment of the composite organic compound.

In some embodiments, the substitute R1 and/or R2 is connected to the aromatic polycyclic conjugated molecule (Core) via at least one connecting group. The at least one connecting group may be selected from the list comprising the following structures: ether, amine, ester, amide, substituted amide, alkenyl, alkynyl, sulfonyl, sulfonate, sulfonamide, or substituted sulfonamide.

In some embodiments, the substitute R3 and/or R4 may be connected to the aromatic polycyclic conjugated molecule (Core) via at least one connecting group. The at least one connecting group may be selected from the list comprising $CH_2$, $CF_2$, $SiR_2O$, $CH_2CH_2O$, wherein R is selected from the list comprising H, alkyl, and fluorine. In another embodiment of the composite organic compound, the one or more ionic groups include at least one ionic group selected from the list comprising $[NR_4]^+$, $[PR_4]^+$ as cation and $[—CO_2]^-$, $[—SO_3]^-$, $[—SR_5]^-$, $[—PO_3R]^-$, $[—PR_5]^-$ as anion, wherein R is selected from the list comprising H, alkyl, and fluorine.

Furuta co-polymers and para-Furuta polymers (herein referred to collectively as Furuta Polymers unless otherwise specified) are polymeric compounds with insulating tails, and linked/tethered/partially immobilized polarizable ionic groups. The insulating tails are hydrocarbon (saturated and/or unsaturated), fluorocarbon, siloxane, and/or polyethylene glycol linear or branched chains covalently bonded to the co-polymer backbone. The tails act to insulate the polarizable tethered/partially immobilized ionic molecular components and ionic pairs from other ionic groups and ionic group pairs on the same or parallel co-polymers, which favorably allows discrete polarization of counter ionic liquid pairs or counter Q groups (i.e. polarization of cationic liquid and anionic liquid tethered/partially immobilized to parallel Furuta polymers) with limited or no interaction of ionic fields or polarization moments of other counter ionic group pairs partially immobilized on the same or parallel co-polymer chains. Further, the insulating tails electrically insulate supra-structures of Furuta polymers from each other. Parallel Furuta polymers may arrange or be arranged such that counter ionic groups (i.e. tethered/partially immobilized ionic groups (Qs) of cation and anion types (sometimes known as cationic Furuta polymers and anionic Furuta polymers)) are aligned opposite from one another.

A Furuta co-polymer has the following general structural formula:

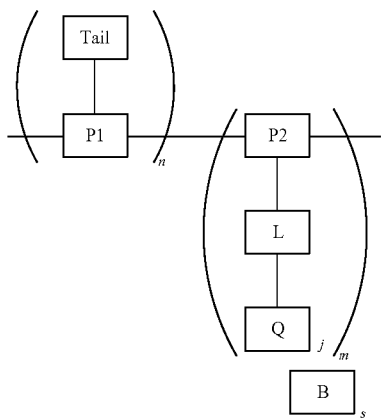

wherein backbone structure of the co-polymer comprises structural units of first type P1 and structural units of second type P2 both of which randomly repeat and are independently selected from the list comprising acrylic acid, methacrylate, repeat units of polypropylene (—[$CH_2$—CH($CH_3$)]—), repeat units of polyethylene (—|$CH_2$|—), siloxane, or repeat units of polyethylene terephthalate (sometimes written poly(ethylene terephthalate)) for which the repeat unit may be expressed as —$CH_2$—$CH_2$—O—CO—$C_6H_4$—CO—O—. Parameter n is the number of the P1 structural units in the backbone structure which is in the range from 3 to 100 000 and m is number of the P2 structural units in the backbone structure which is in the range from 3 to 100 000. Further, the first type structural unit (P1) has a resistive substitute Tail which is oligomers of polymeric material with HOMO-LUMO gap no less than 2 eV. Additionally, the second type of structural units (P2) has an ionic functional group Q which is connected to P2 via a linker group L. The parameter j is a number of functional groups Q attached to the linker group L, which may range from 0 to 5. Wherein the ionic functional group Q comprises one or more ionic liquid ions (from the class of ionic compounds that are used in ionic liquids), zwitterions, or polymeric acids. Further, an energy interaction of the ionic Q groups may be less than kT, where k is Boltzmann constant and T is the temperature of environment. Still further, parameter B is a counter ion which is a molecule or molecules or oligomers that can supply the opposite charge to balance the charge of the co-polymer. Wherein, s is the number of the counter ions.

A para-Furuta polymer has repeat units of the following general structural formula:

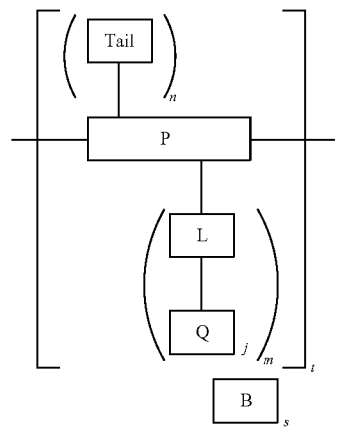

wherein a structural unit P comprises a backbone of the copolymer, which is independently selected from the list comprising acrylic acid, methacrylate, repeat units for polypropylene (PP) (—[$CH_2$—CH($CH_3$)]—), repeat units for polyethylene (PE) (—[$CH_2$]—)—, siloxane, or repeat units of polyethylene terephthalate (sometimes written poly(ethylene terephthalate)) for which the repeat unit may be expressed as —$CH_2$—$CH_2$—O—CO—$C_6H_4$—CO—O—. Wherein the first type of repeat unit (Tail) is a resistive substitute in the form of an oligomer of a polymeric material. The resistive substitute preferably has a HOMO-LUMO gap no less than 2 eV. The parameter n is a number of Tail repeat units on the backbone P structural unit, and is in the range from 3 to 100 000. Further, the second type of repeat units (-L-Q) include an ionic functional group Q which is connected to the structural backbone unit (P) via a linker group L, and m is number of the -L-Q repeat units in the backbone structure which is in the range from 3 to 100 000. Additionally, the ionic functional group Q comprises one or more ionic liquid ions (from the class of ionic compounds that are used in ionic liquids), zwitterions, or polymeric acids. An energy of interaction of the ionic Q groups may be less than kT, where k is Boltzmann constant and T is the temperature of environment. Still further, the parameter t is average of para-Furuta polymer repeat units, ranging from 6 to 200 000. Wherein B's are counter ions which are molecules or oligomers that can supply the opposite charge to balance the charge of the co-polymer, s is the number of the counter ions.

A meta-dielectric is defined here as a dielectric material comprised of one or more types of structured polymeric materials (SPMs) having a relative permittivity greater than or equal to 1000 and resistivity greater than or equal to $10^{13}$ ohm/cm. Individually, the SPMs in a meta-dielectric may form column like supramolecular structures by pi-pi interaction or hydrophilic and hydrophobic interactions. Said supramolecules of SPMs may permit formation of crystal structures of the meta-dielectric material. By way of using SPMs in a dielectric material, polarization units are incorporated to provide the molecular material with high dielectric permeability. There are several mechanisms of polarization such as dipole polarization, ionic polarization, and hyper-electronic polarization of molecules, monomers and polymers possessing metal conductivity. All polarization units with the listed types of polarization may be used in aspects of the present disclosure. Further, SPMs are composite materials which incorporate an envelope of insulating substituent groups that electrically isolate the supramolecules from each other in the dielectric layer and provide high breakdown voltage of the energy storage molecular material. Said insulating substituent groups are hydrocarbon (saturated and/or unsaturated), fluorocarbon, siloxane, and/or polyethylene glycol linear or branched chains covalently bonded to a polarizable core or co-polymer backbone, forming the resistive envelope.

As depicted in FIG. 10, in one embodiment of the energy storage cell 1, each of the one or more meta-capacitors 20 comprises a first electrode 21, a second electrode 22, and a meta-dielectric material layer 23 disposed between said first and second electrodes. The electrodes 21, 22 may be made of a metal, such as copper, zinc, or aluminum or other conductive material and are generally planar in shape. In one implementation, the electrodes and meta-dielectric material layer 23 are in the form of long strips of material that are sandwiched together and wound into a coil along with an insulating material, e.g., a plastic film such as polypropylene or polyester to prevent electrical shorting between the electrodes 21, 22. Examples of such coiled capacitor energy storage devices are described in detail in commonly-assigned U.S. patent application Ser. No. 14/752,600, filed Jun. 26, 2015, the entire contents of which are incorporated herein by reference. Although a single meta-capacitor 20 is shown for convenience in FIG. 10, aspects of the present disclosure are not limited to such implementations. As illustrated in FIGS. 7A, 7B, 7C, 7D, those skilled in the art will recognize that the capacitive energy storage device 2 may include multiple meta-capacitors 20 connected in parallel, as in FIG. 7B, to provide a desired amount of energy storage capacity that scales roughly with the number of meta-capacitors in parallel. Alternatively, the capacitive energy storage device 2 may include two or more meta-capacitors connected in series to accommodate a desired voltage level, as in FIG. 7C. In addition, the capacitive energy storage device 2 may include combinations of three or more meta-capacitors in a capacitor network involving various series and parallel combinations, as in FIG. 7D. For example, there may be three capacitor combinations connected in parallel with each other with each combination having two capacitors connected in series.

The meta-dielectric material 23 may be characterized by a dielectric constant κ greater than about 100 and a breakdown field $E_{bd}$ greater than or equal to about 0.01 volts (V)/nanometer (nm). The dielectric constant κ may be greater than or equal to about 100, 200, 300, 400, 500, 1000, 2000, 3000, 4000, 5000, 6000, 7000, 8000, 9000, 10,000, or 100,000. The breakdown field may be greater than about 0.01 V/nm, 0.05 V/nm, 0.1 V/nm, 0.2 V/nm, 0.3 V/nm, 0.4 V/nm, 0.5 V/nm, 1 V/nm, or 10 V/nm. By way of example, and not by way of limitation, the meta-dielectric material 23 may be characterized by a dielectric constant κ between about 100 and about 1,000,000 and a breakdown field Ebd between about 0.01 V/nm and about 2.0 V/nm.

In yet another implementation, the capacitive energy storage devices may comprise more than one of the meta-capacitors connected in series or parallel. In still another implementation, the capacitive energy storage device may further comprise a cooling mechanism 30. In some implementations, the cooling can be passive, e.g., using radiative cooling fins on the capacitive energy storage device 2 and DC-voltage conversion device 3. Alternatively, a fluid such as air, water or ethylene glycol can be used as a coolant in an active cooling system. By way of example, and not by way of limitation, the cooling system 30 may include conduits in thermal contact with the capacitive energy storage device 2 and DC-voltage conversion device 3. The conduits are filled with a heat exchange medium, which may be a solid, liquid or gas. In some implementations, the cooling mechanism may include a heat exchanger configured to extract heat from the heat exchange medium. In other implementations, the cooling mechanism 30 may include conduits in the form of cooling fins on the capacitive energy storage device 2 and DC-voltage conversion device 3 and the heat exchange medium is air that is blown over the cooling fins, e.g., by a fan. In another embodiment of the present invention, the heat exchanger 32 may include a phase-change heat pipe configured to carry out cooling. The cooling carried out by the phase-change heat pipe may involve a solid to liquid phase change (e.g., using melting of ice or other solid) or liquid to gas phase change (e.g., by evaporation of water or alcohol) of a phase change material. In yet another implementation, the conduits or heat exchanger 32 may include a reservoir containing a solid to liquid phase change material, such as paraffin wax.

Referring again to FIGS. 10, 11 and 12 the DC-voltage conversion device 3 may include a buck converter for applications in which $V_{out}<V_{in}$, a boost converter for applications in which $V_{out}>V_{in}$, or a bidirectional buck/boost converter for applications in which $V_{out}<V_{in}$ in certain situations and $V_{out}>V_{in}$ in other situations.

In still another embodiment of the energy storage cell (see, FIG. 11) the DC-voltage conversion device 3 may be connected to a control board 4 containing suitable logic circuitry, e.g., microprocessor, microcontroller, application specific integrated circuit (ASIC), field programmable gate array (FPGA), a complex programmable logic device (CPLD), capable of implementing closed loop control processes 90 and (optionally) a communication interface 5, as well as an analog to digital converter coupled to sensors on the DC-voltage conversion device 3, e.g., voltage sensors V for the input voltage $V_{in}$ and the output voltage $V_{out}$, current sensors A for current $I_{sd}$ to/from the capacitive energy storage device 2 and/or current $I_{vc}$ to/from the DC-voltage conversion device 3, temperature sensors T on the capacitive energy storage device and/or DC-voltage conversion device. In some implementations, the control board 4 may be integrated into the DC-voltage conversion device 3. The conversion device 3 may contain a buck regulator, a boost regulator, buck and boost regulators with separate input/outputs, a bi-directional boost/buck regulator, or a split-pi converter and the control board 4 may be configured to maintain a constant output voltage $V_{out}$ from the DC-voltage conversion device during discharge, and/or charge the capacitor at a more-or-less constant current while maintaining a stable input voltage.

By way of example, and not by way of limitation, the control board 4 may be based on a controller for a bidirectional buck/boost converter. In such a configuration, the control board 4 stabilizes the output voltage of the DC-voltage conversion device according to the following algorithm forming the control loop 90:
  a) determining a target output voltage level for the energy storage system,
  b) measuring the voltage of a capacitive energy storage device,
  c) configuring a bidirectional buck/boost converter to buck down the voltage and direct current in the output direction IF the voltage on the capacitive energy storage device is higher than the desired output voltage and the desired outcome is to discharge the device,
  d) configuring a bidirectional buck/boost converter to boost up the voltage and direct current in the output direction IF the voltage on the capacitive energy storage device is lower than the desired output voltage and the desired outcome is to discharge the device,
  e) configuring a bidirectional buck/boost converter to buck down the voltage and direct current in the input direction IF the voltage on the capacitive energy storage device is lower than the desired input voltage and the desired outcome is to charge the device,
  f) configuring a bidirectional buck/boost converter to boost up the voltage and direct current in the input direction IF the voltage on the capacitive energy storage device is higher than the desired output voltage and the desired outcome is to charge the device,
  g) configuring a bidirectional buck/boost converter to stop outputting power if the voltage on the capacitive energy storage device falls below a predetermined level,
  h) configuring a bidirectional buck/boost converter to stop inputting power if the voltage on the capacitive energy storage device exceeds a predetermined level, i) repeating steps (a) through (f) (or steps (a) through (h)) as necessary.

Figure 15A:
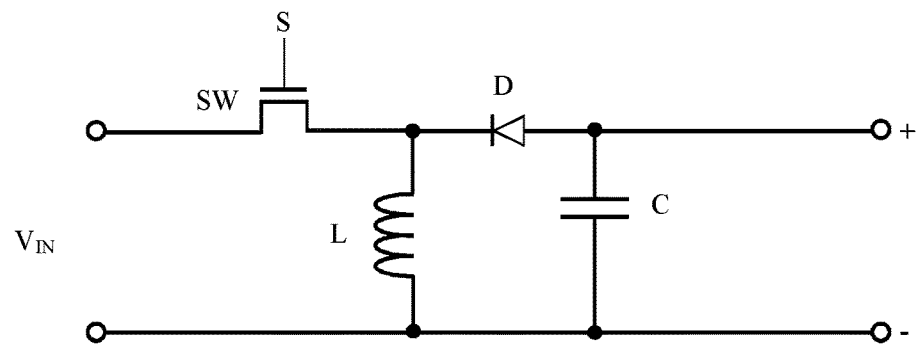
FIG. 15A shows an example of a single switch buck-boost converter that may be implemented in a switch-mode voltage converter, which could be selected for use in a DC voltage conversion device in an energy storage cell according to aspects of the present disclosure.

The specifics of operation of the control board 4 are somewhat dependent on the type of buck/boost converter(s) used in the DC-voltage conversion device 3. For example, a buck/boost converter may be a single switch converter of the type shown in FIG. 15A. This type of converter includes a high-side switch SW having an input side coupled to the input voltage $V_{in}$ and an output side coupled to one side of an inductor L, the other side of which is connected to the ground or common voltage (−). A capacitor C is coupled across the output voltage Vout. A pulsed switching signal S turns the switch on and off. The output voltage depends on the duty cycle of the switching signal S. By way of example, the switches may be implanted as gated switch devices, e.g., MOSFET devices, stacked MOSFET devices, IGCT devices, high drain-source voltage SiC MOSFET devices, and the like depending on the voltage and/or current requirements of the DC-voltage converter for the energy storage cell. In the case of gated switching devices, the control board provides the signals to the gate terminals of the switching devices. The control board 4 can configure this type of buck/boost converter to buck or boost by adjusting the duty cycle of the switching signal S.

Figure 15B:
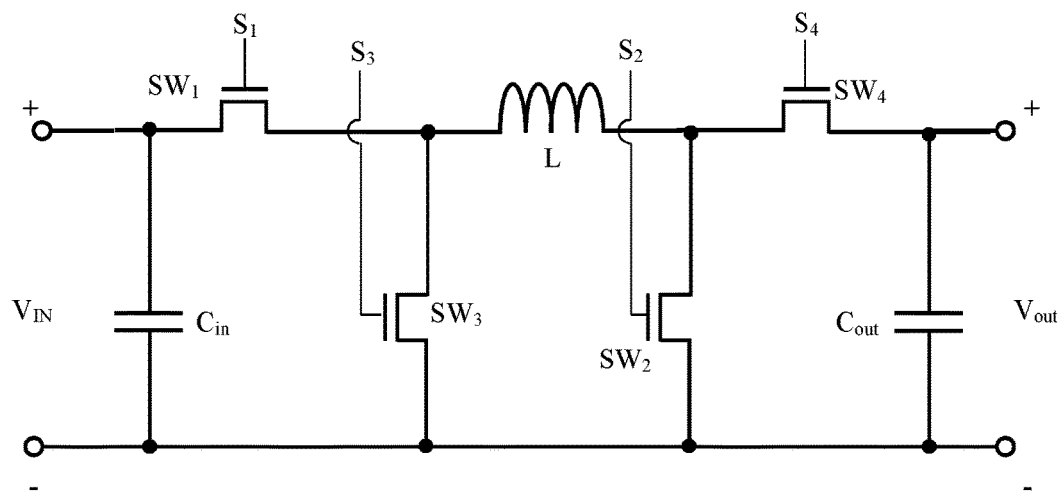
FIG. 15B shows an example of a four switch buck-boost converter that may be implemented in a switch-mode voltage converter, which could be selected for use in a DC voltage conversion device in an energy storage cell according to aspects of the present disclosure.

FIG. 15B shows an alternative four-switch buck/boost converter. In this type of converter, a first switch SW1 is connected between the high side (+) of the input voltage $V_{in}$ and an input side of the inductor L, a second switch SW2 is connected between an output side of the inductor L and the common voltage (−), a third switch SW3 is connected between the input side of the inductor L and the common voltage, and a fourth switch SW4 is connected between the output side of the inductor and the high side (+) of the output voltage $V_{out}$. An input capacitor $C_{-in}$ may be coupled across the input voltage $V_{in}$ and an output capacitor $C_{out}$ may be coupled across the output voltage $V_{out}$.

Figure 1:
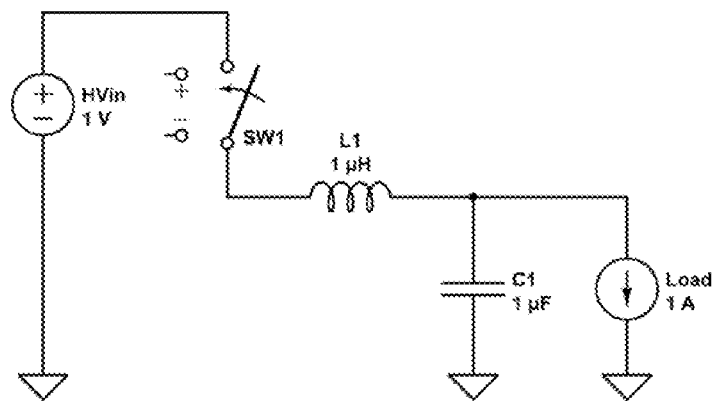
FIG. 1 schematically shows the buck conversion device based on the switched LC filter.
Figure 2:
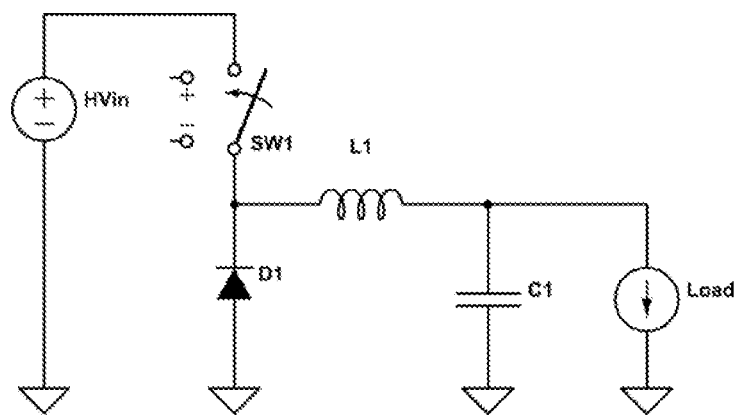
FIG. 2 schematically shows the non-synchronous buck conversion device.
Figure 3:
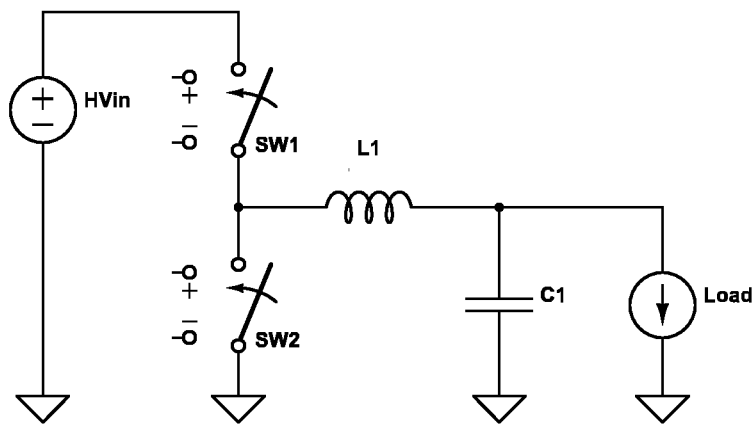
FIG. 3 schematically shows the synchronous buck conversion device.
Figure 4:
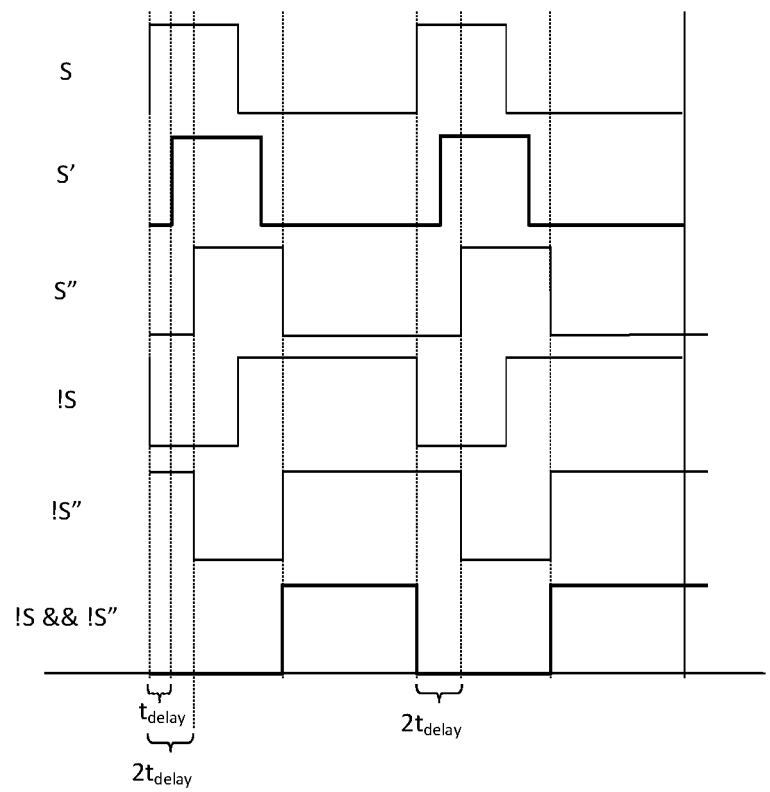
FIG. 4 demonstrates the signal treatment required to generate a pair of signals with the required time delay spacing.
Figure 5:
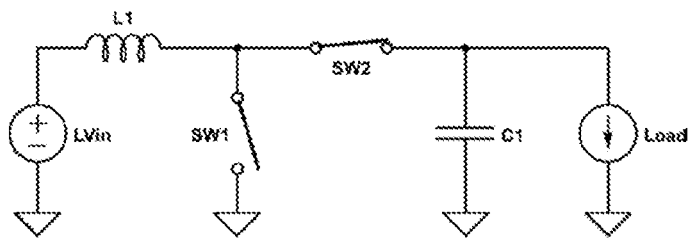
FIG. 5 schematically shows a boost converter in an "on state".
Figure 6:
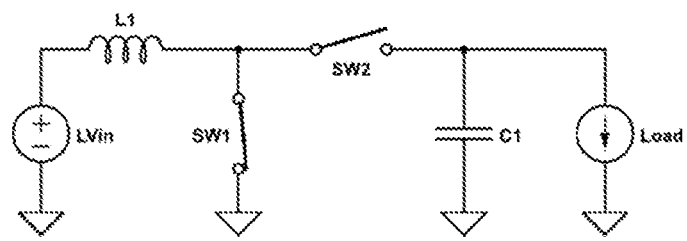
FIG. 6 schematically shows a boost converter in an "off state".
Figure 7A:
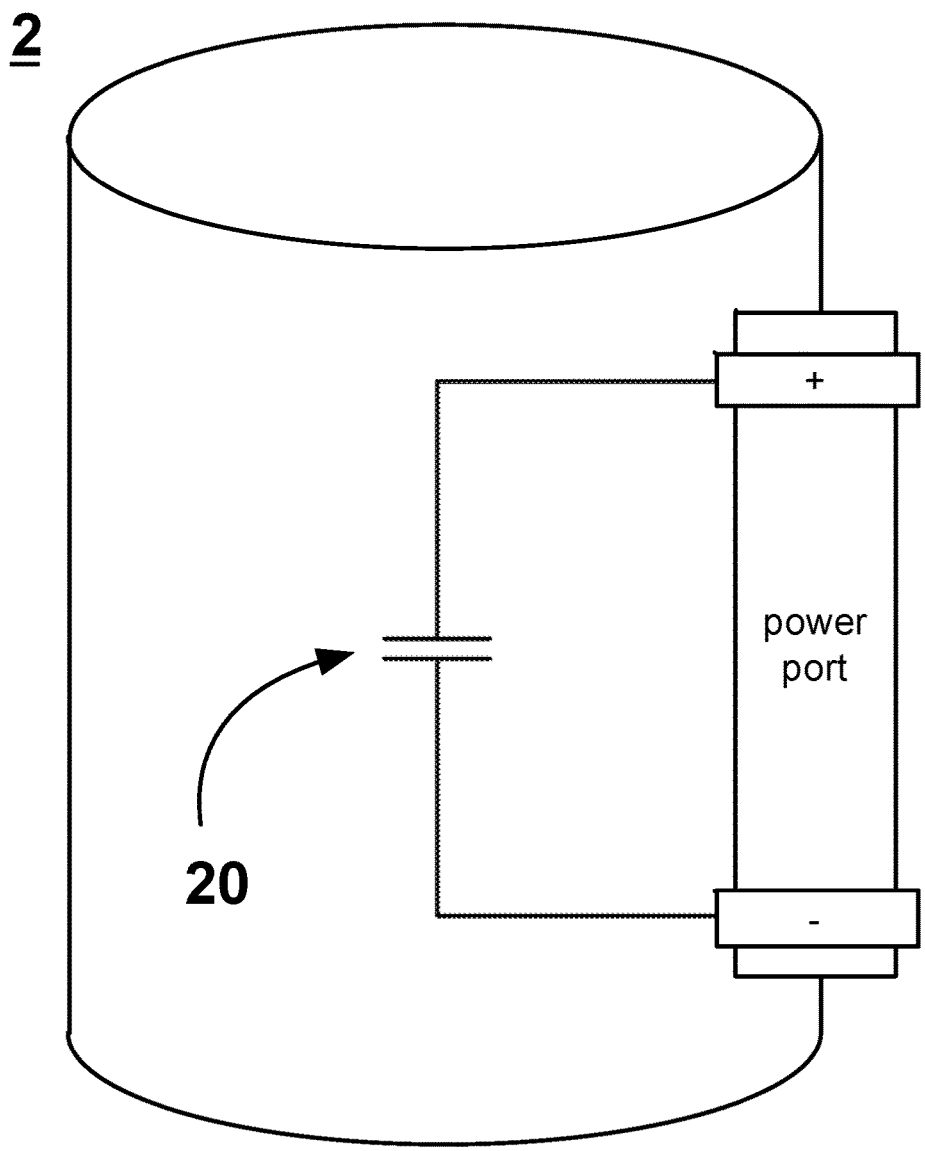
FIG. 7A shows a capacitive energy storage device containing a single capacitive element connected to a two terminal port.
Figure 7B:
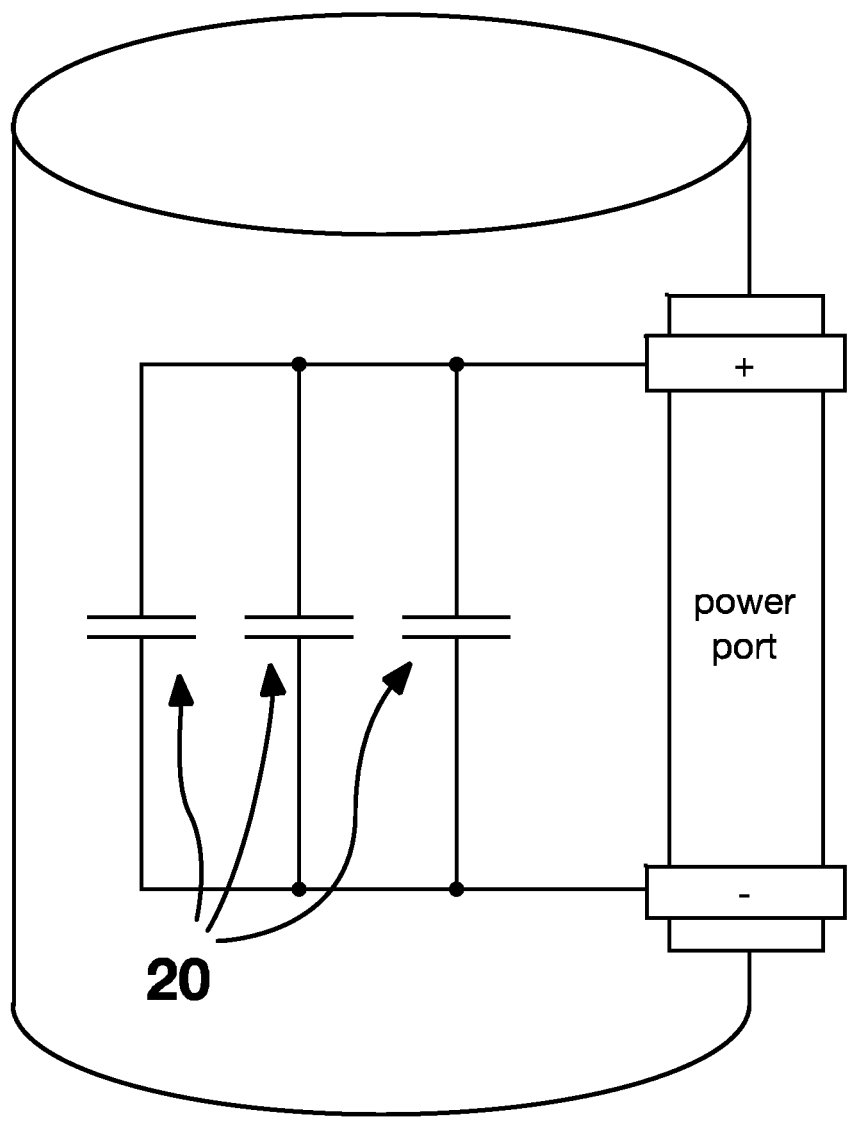
FIG. 7B shows an alternative configuration of a capacitive energy storage device containing multiple elements connected to a two terminal port.
Figure 7C:
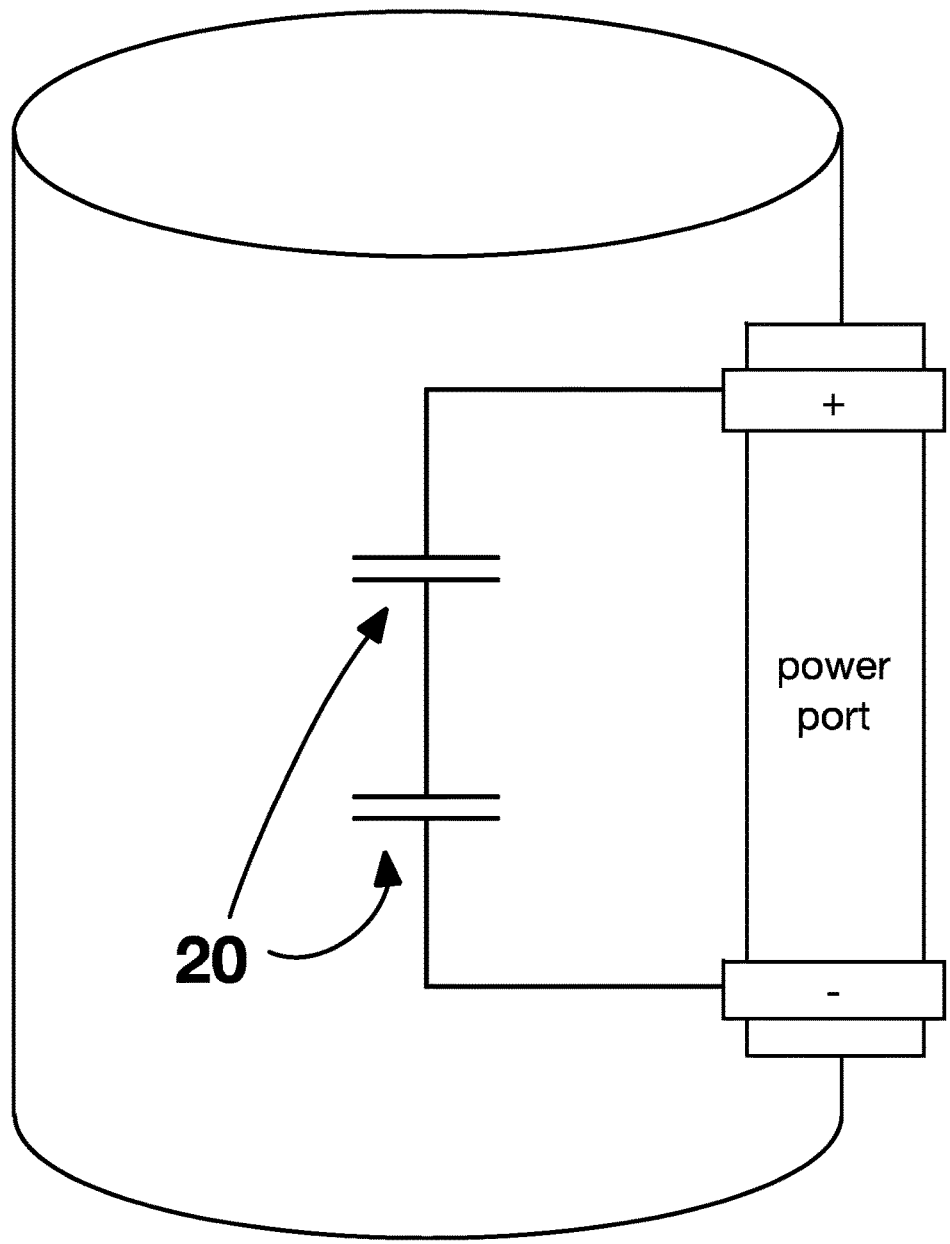
FIG. 7C shows an alternative configuration of a capacitive energy storage device containing multiple elements connected to a two terminal port.
Figure 7D:
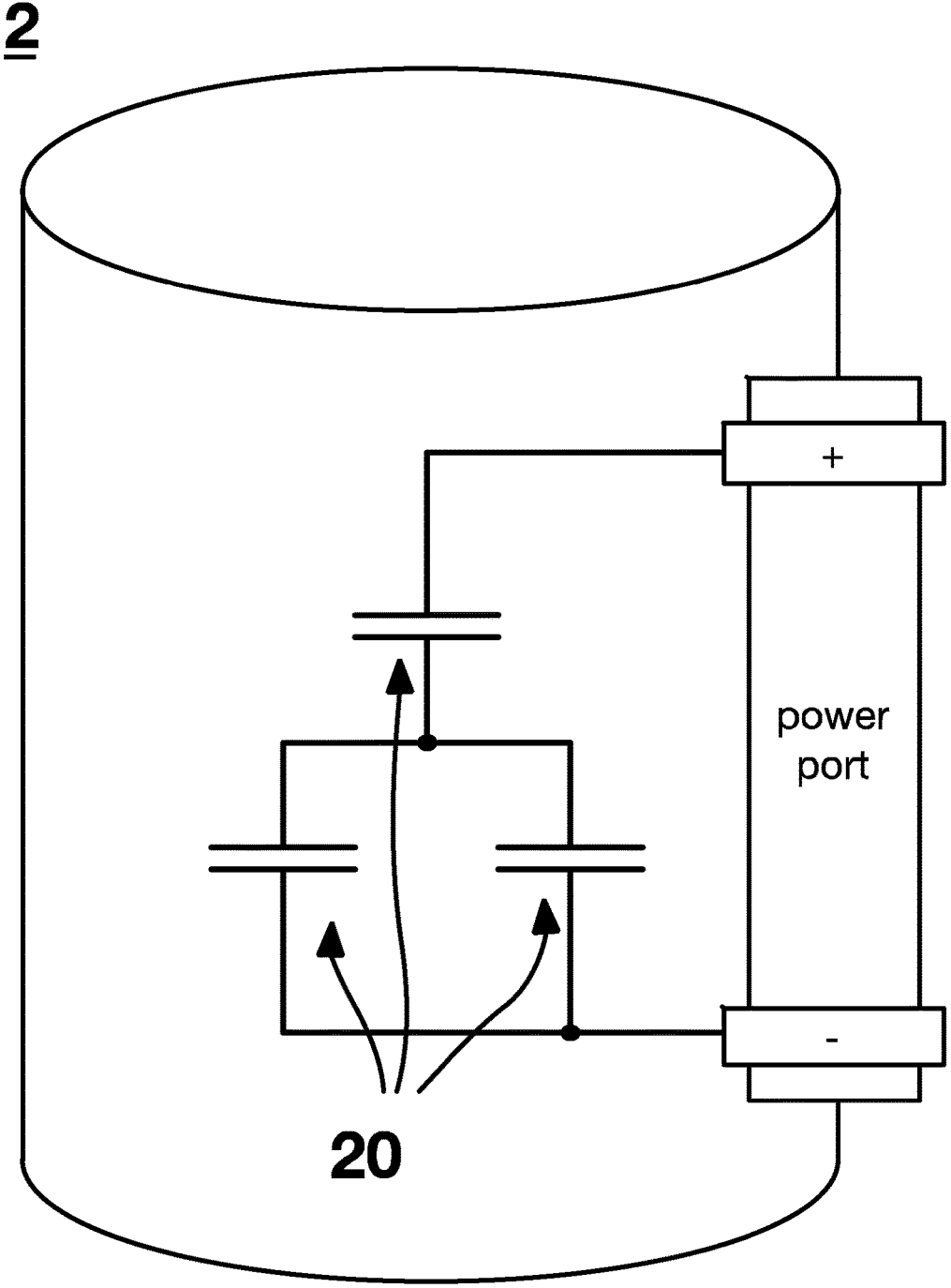
FIG. 7D shows an alternative configuration of a capacitive energy storage device containing multiple elements connected to a two terminal port.

The switches SW1, SW2, SW3, and SW4 change between open (non-conducting) and closed (conducting) states in response to switching signals from the control board 4. To operate in buck mode, the second switch SW2 is open and the fourth switch SW4 closed and pulsed buck mode switching signals are applied to the first switch SW1 and third switch SW3, e.g., as described above with respect to FIG. 3 and FIG. 4. The control board 4 can adjust the output voltage $V_{out}$ in buck mode by adjusting the duty cycle signal of the switching signals S1 and S3. To operate in boost mode, the first switch SW1 is open, the third switch SW3 is closed and pulsed boost mode switching signals are applied to the second switch SW2 and fourth switch SW4, e.g., as described above with respect to FIG. 5 and FIG. 6. The control board 4 can adjust the output voltage $V_{out}$ in boost mode by adjusting the duty cycle signal of the switching signals S2 and S4.

Figure 8A:
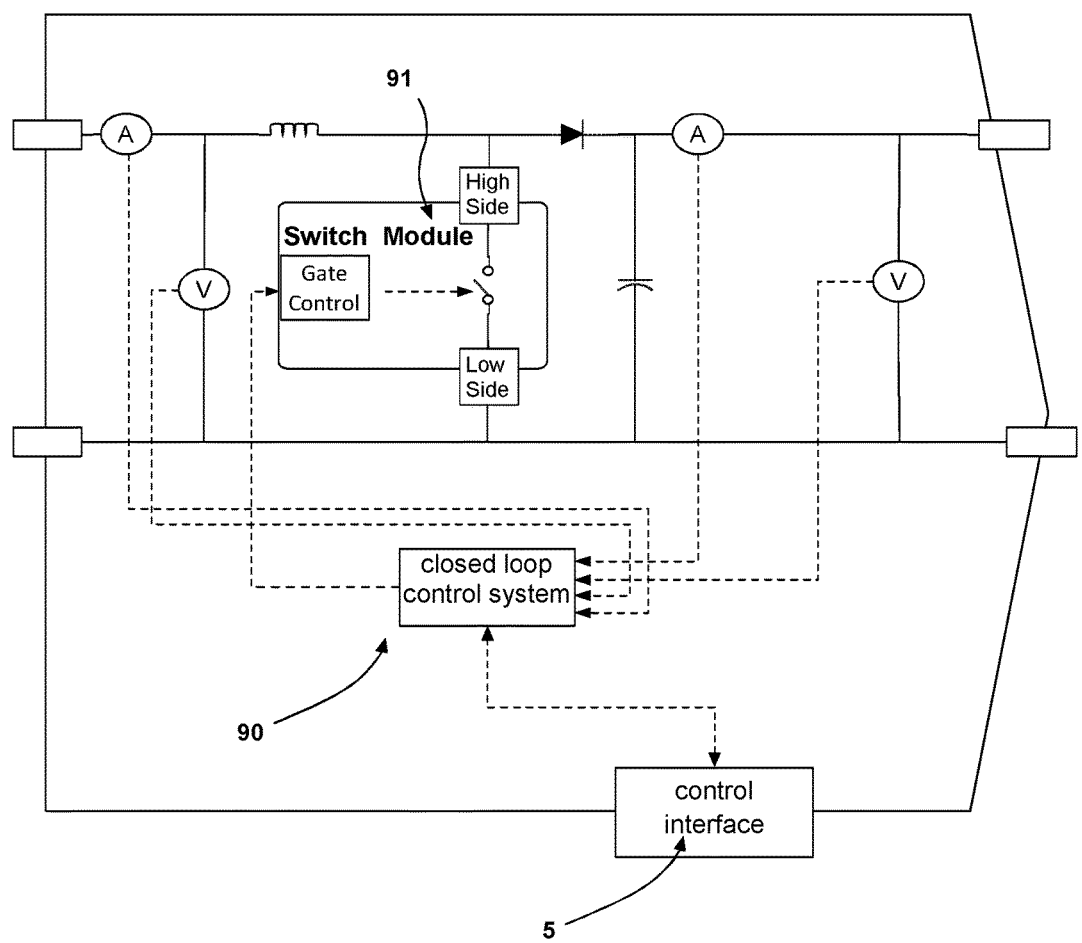
FIG. 8A schematically shows a switch-mode voltage converter implementing a standard boost circuit.
Figure 8B:
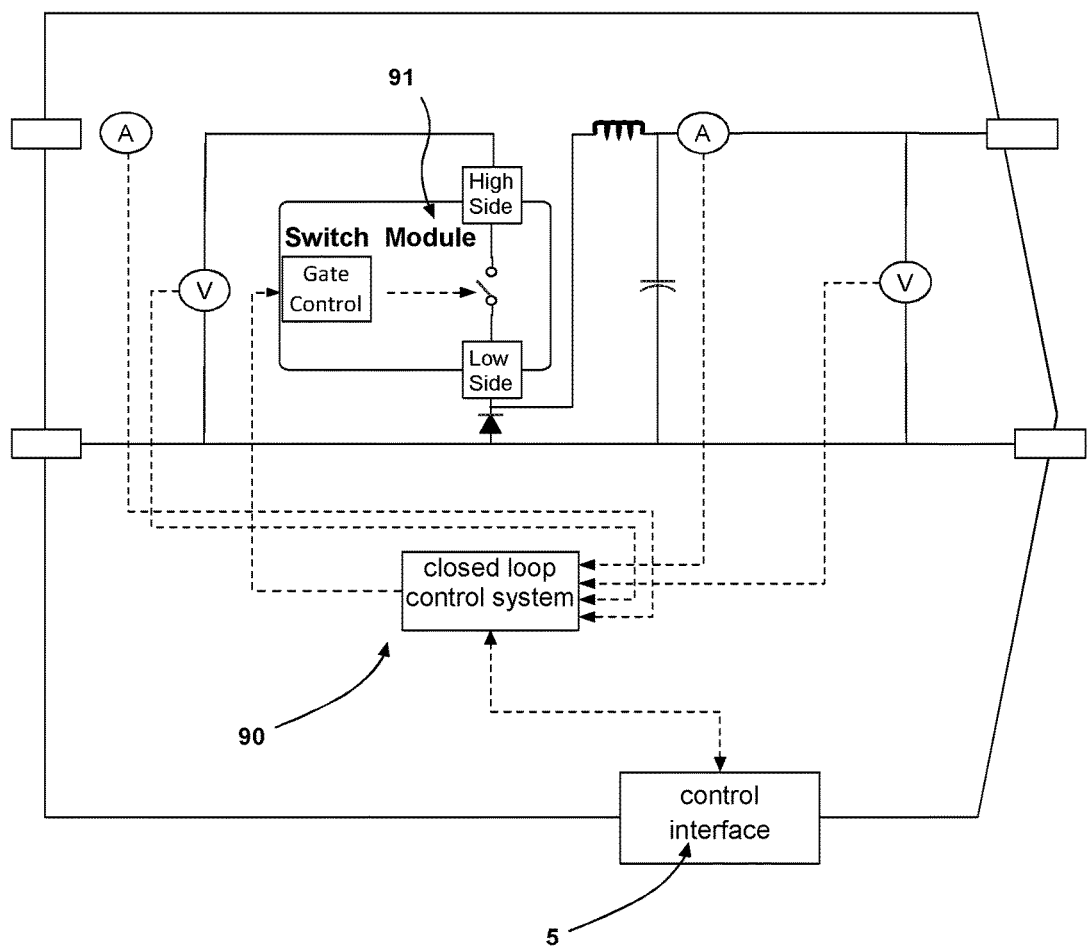
FIG. 8B schematically shows a switch-mode voltage converter implementing a standard buck circuit.
Figure 8C:
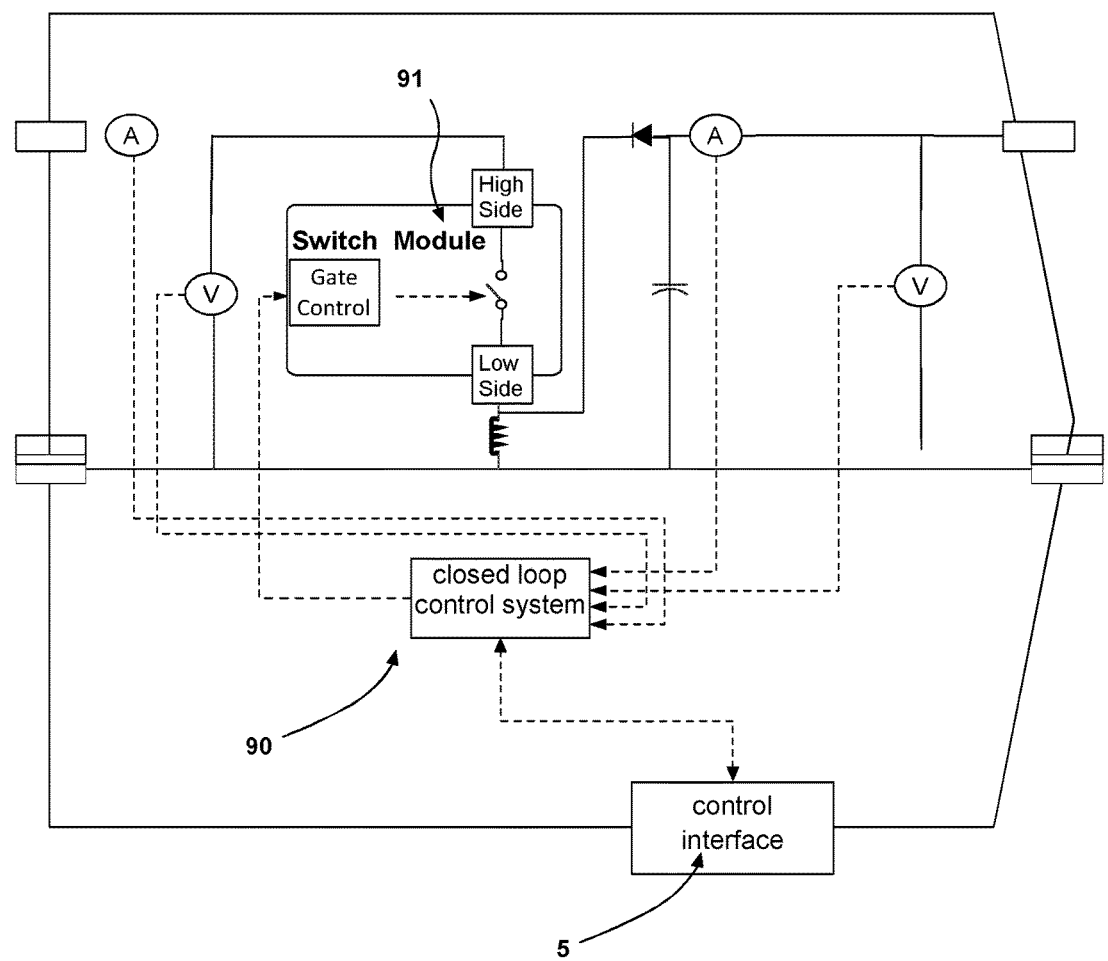
FIG. 8C schematically shows a switch-mode voltage converter implementing a standard inverting buck/boost circuit.
Figure 8D:
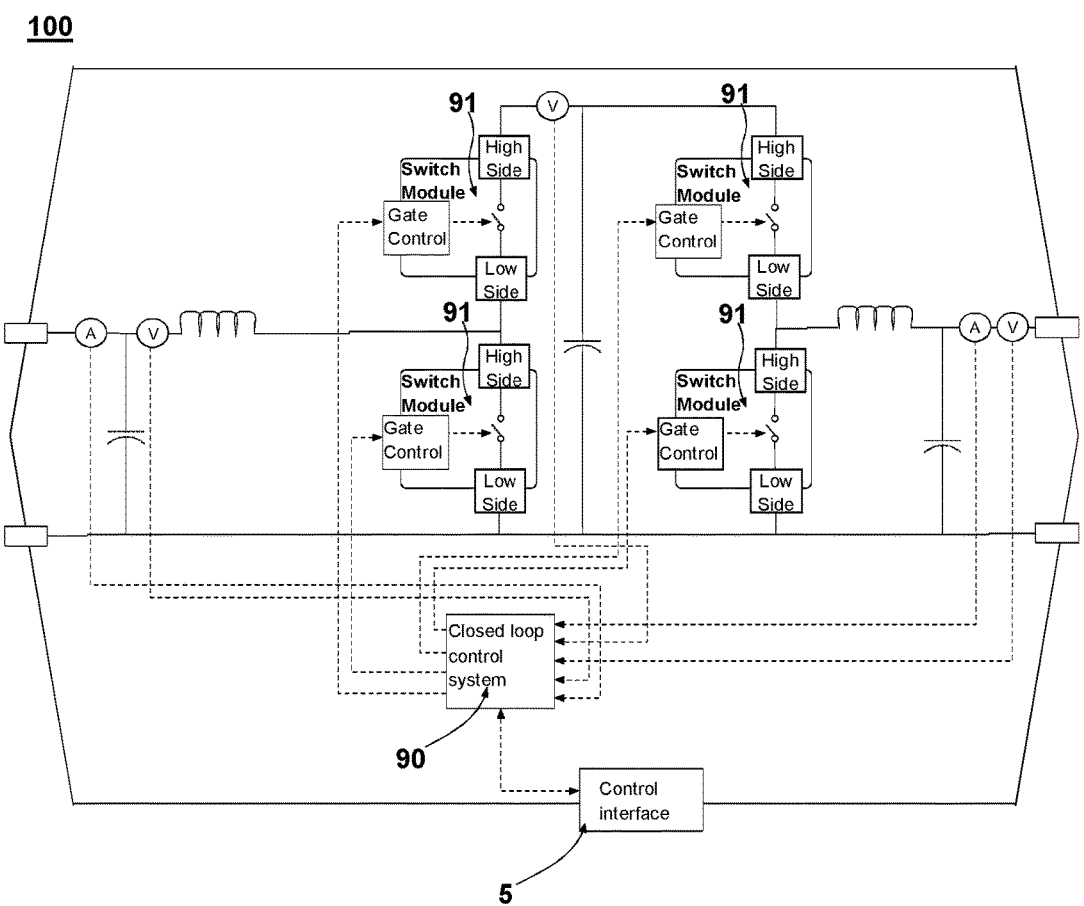
FIG. 8D schematically shows a switch-mode voltage converter implementing a standard non-inverting and bi-directional buck/boost circuit.
Figure 9A:
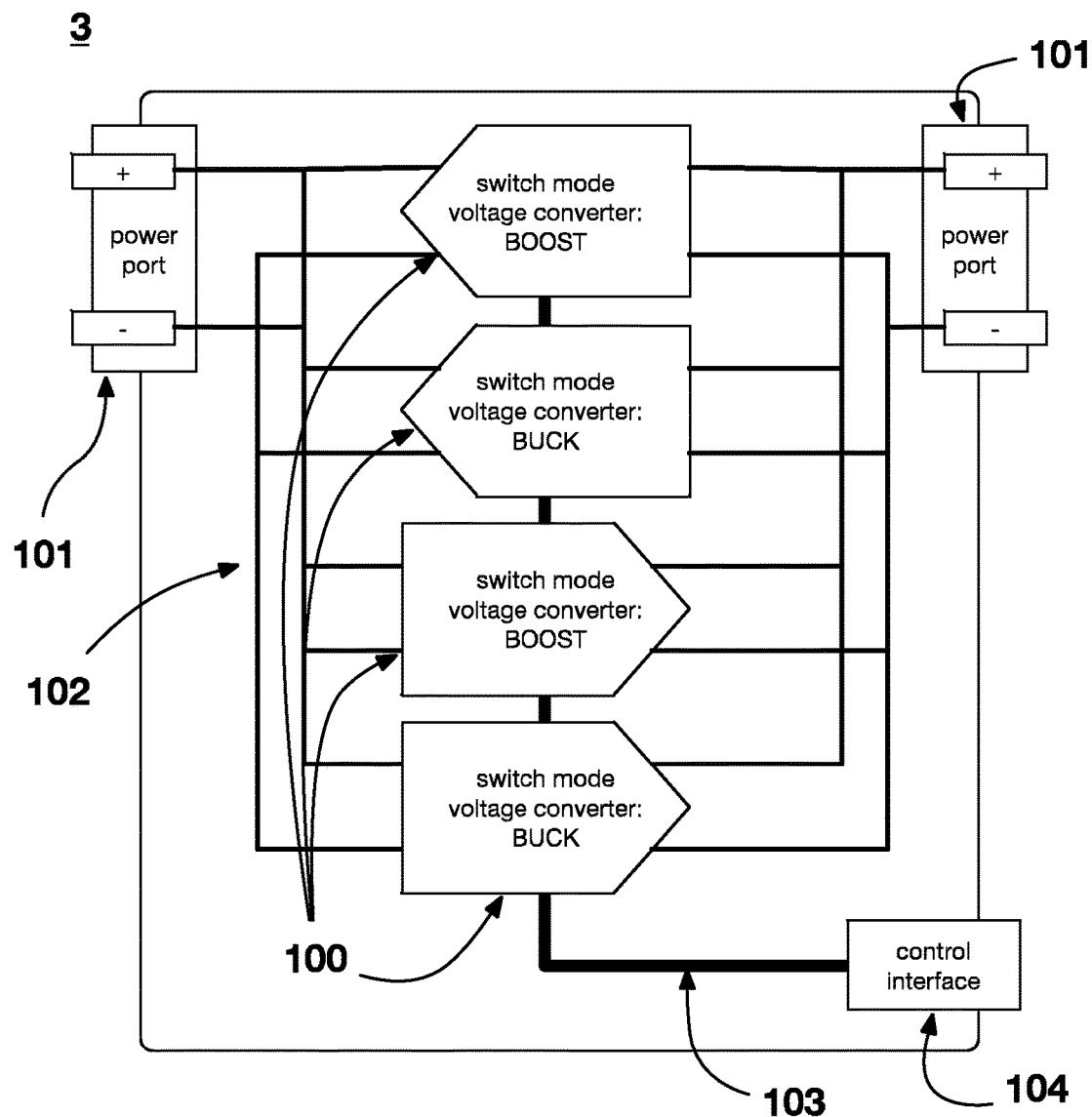
FIG. 9A schematically shows a DC-voltage conversion device having two power ports and separate one or more boost and one or more buck converters for charging a meta-capacitor and separate one or more boost and one or more buck converters for discharging the meta-capacitor.
Figure 9B:
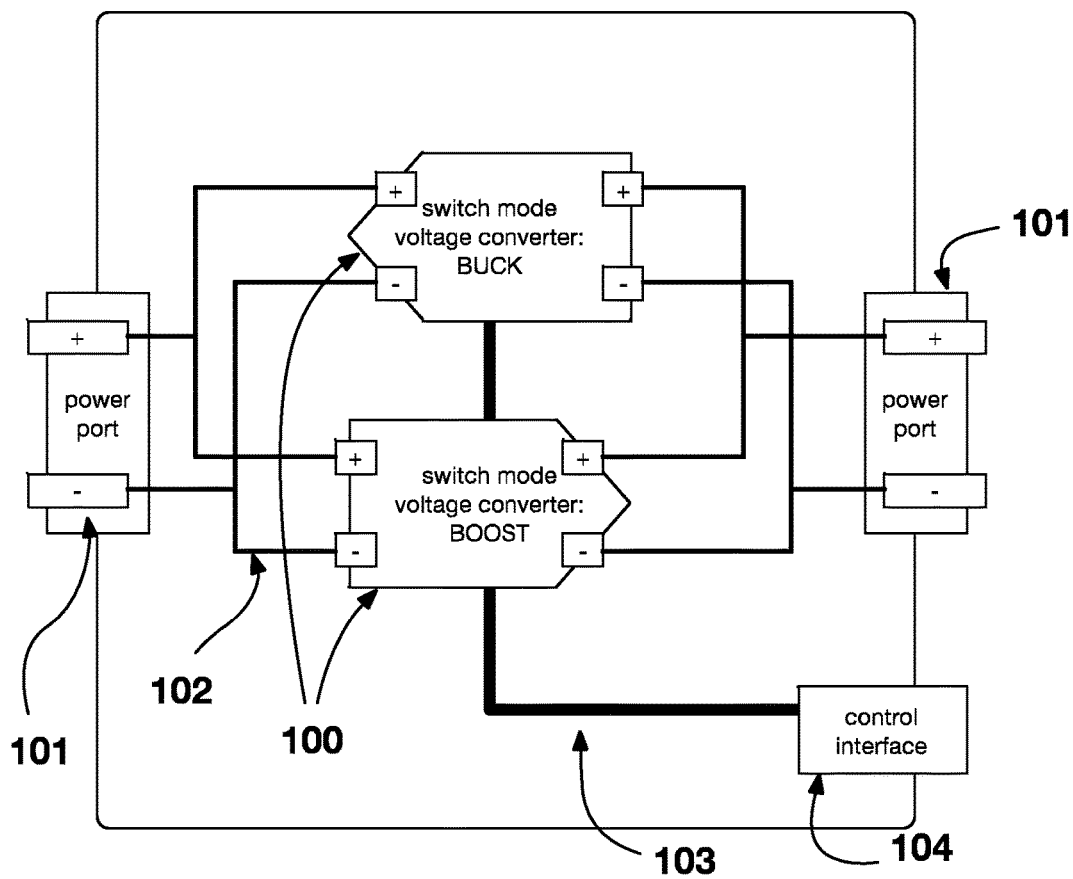
FIG. 9B schematically shows an alternative DC-voltage conversion device having two power ports and a one or more buck converters for charging a meta-capacitor and one or more buck boost converter for the discharging the meta-capacitor.
Figure 9C:
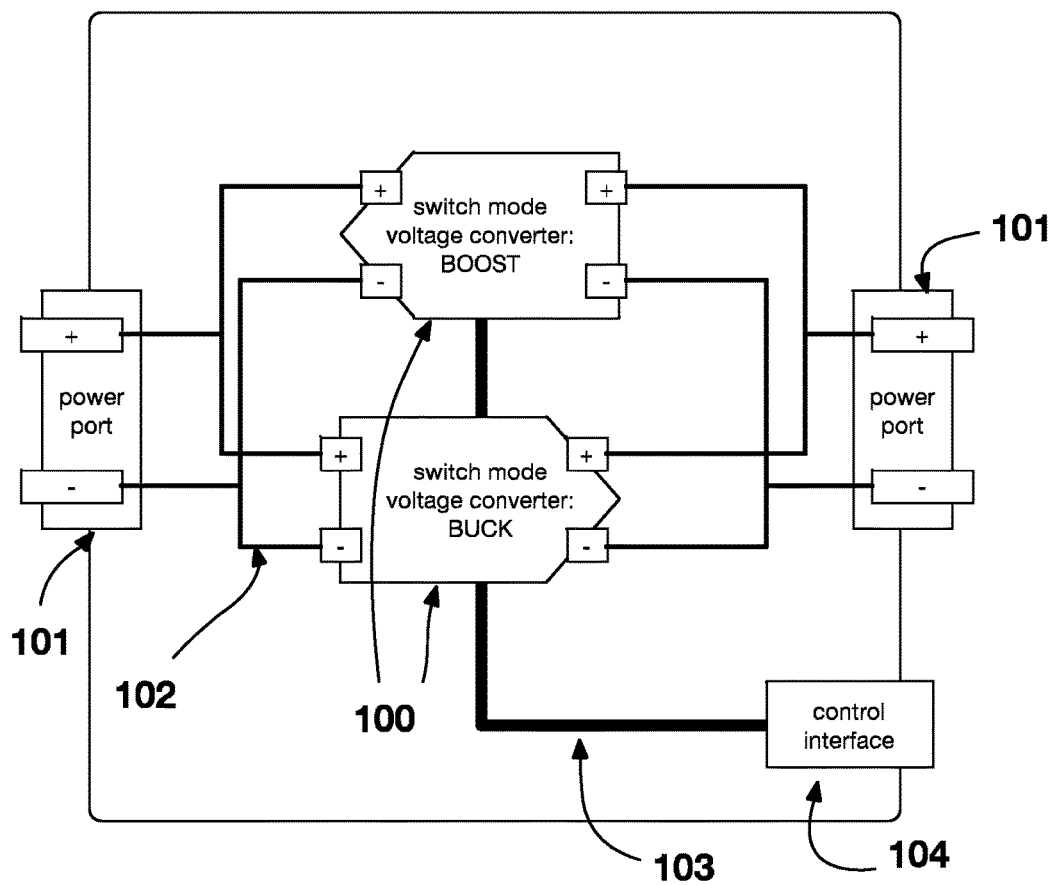
FIG. 9C schematically shows another alternative DC-voltage conversion device having two power ports and one or more boost converters for the charge and one or more buck converters for discharging a meta-capacitor.
Figure 9D:
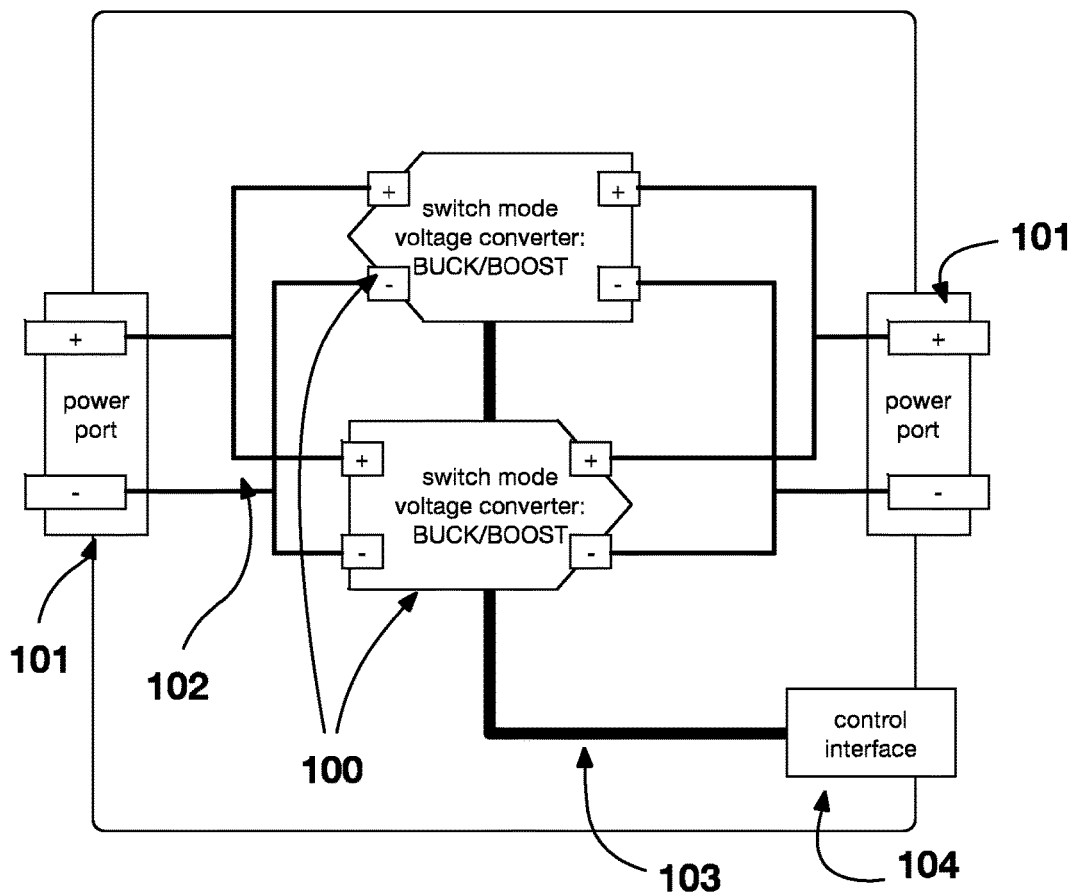
FIG. 9D schematically shows another alternative DC-voltage conversion device having two power ports and one or more buck/boost converters for charging a meta-capacitor and one or more buck/boost converters for discharging the meta-capacitor.
Figure 9E:
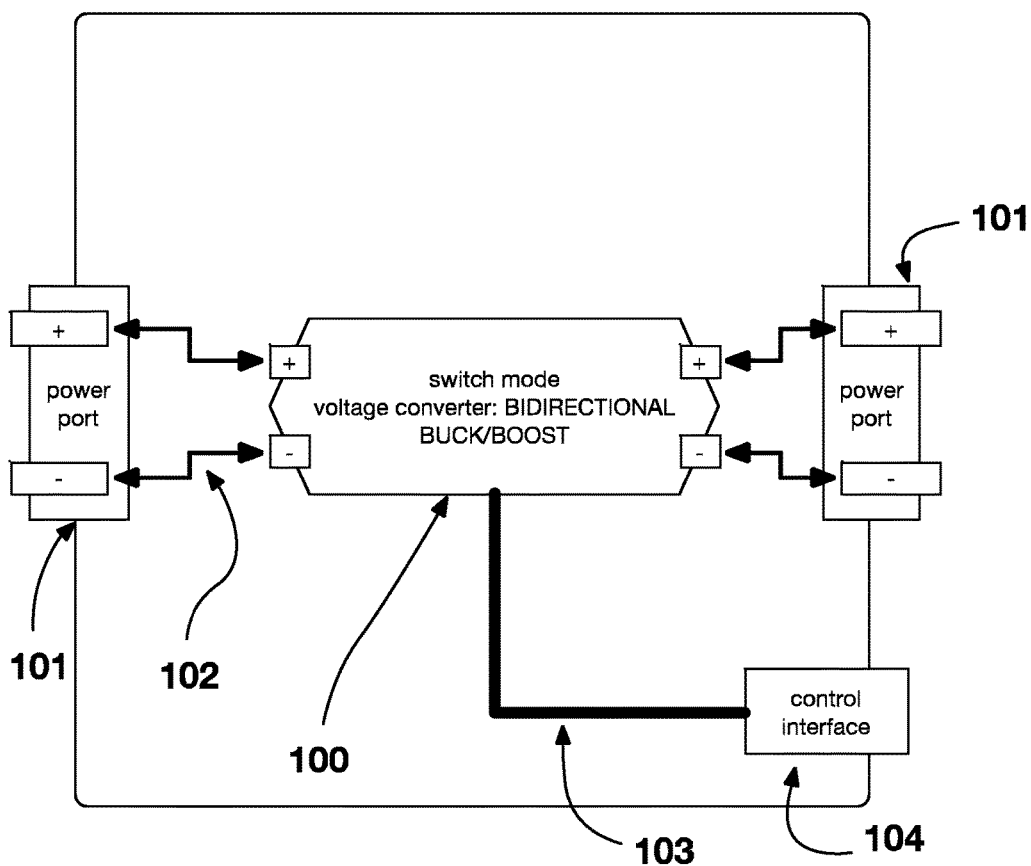
FIG. 9E schematically shows yet another DC-voltage conversion device having two power ports and one or more bidirectional boost/buck converters for the charging and discharging a meta-capacitor.
Figure 9F:
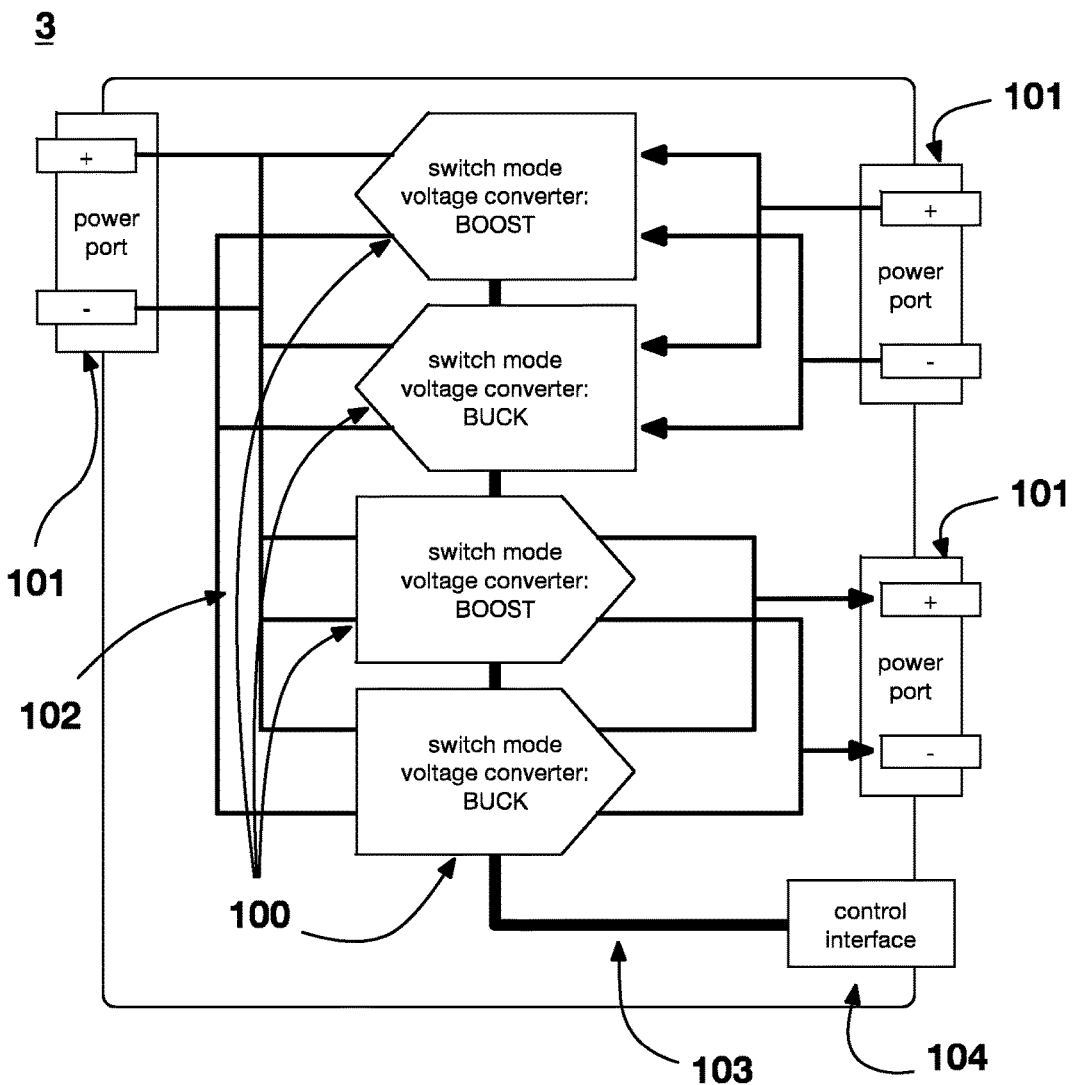
FIG. 9F schematically shows still another DC-voltage conversion device having three power ports and separate one or more boost and one or more buck converters for charging a meta-capacitor and separate one or more boost and one or more buck converters for discharging the meta-capacitor.
Figure 9G:
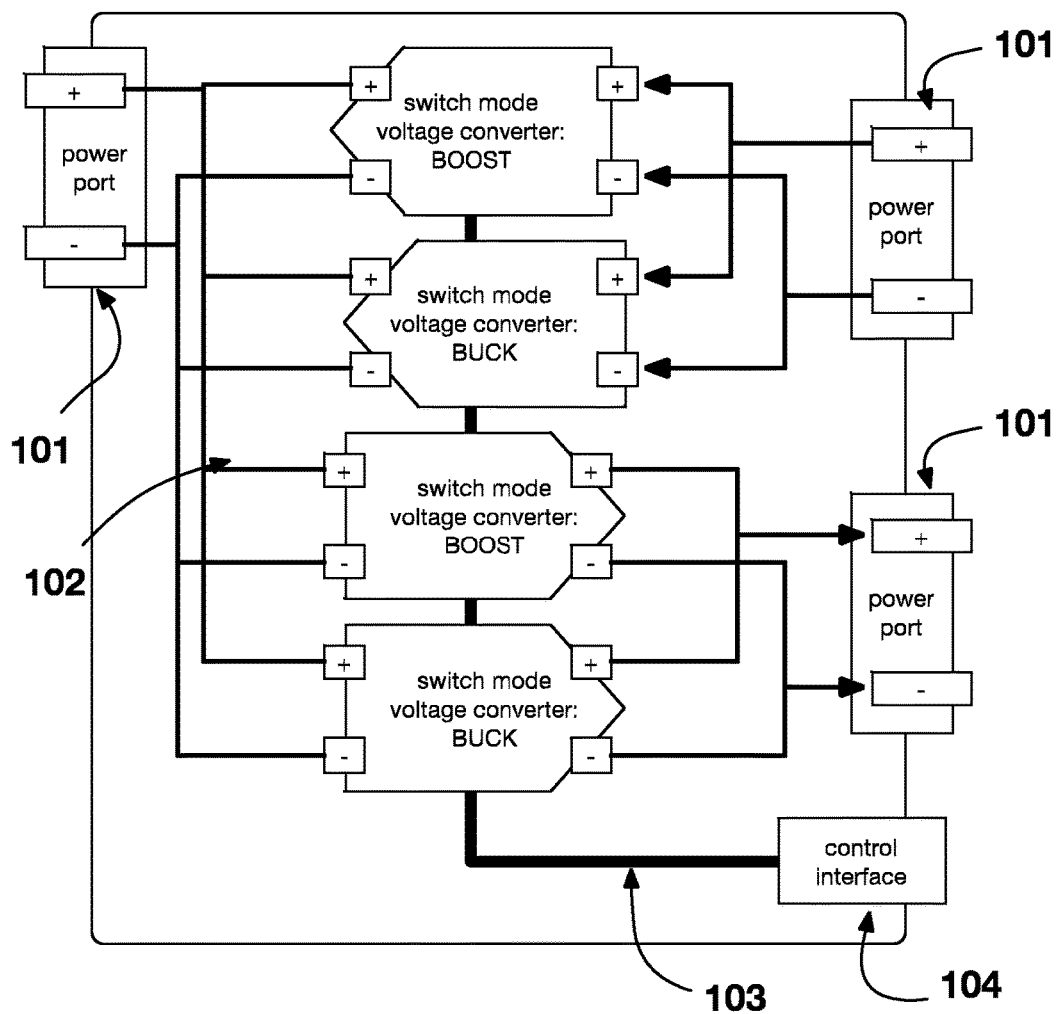
FIG. 9G schematically shows another DC-voltage conversion device having three power ports and a one or more buck converters for charging a meta-capacitor and one or more buck boost converter for discharging the meta-capacitor.
Figure 9H:
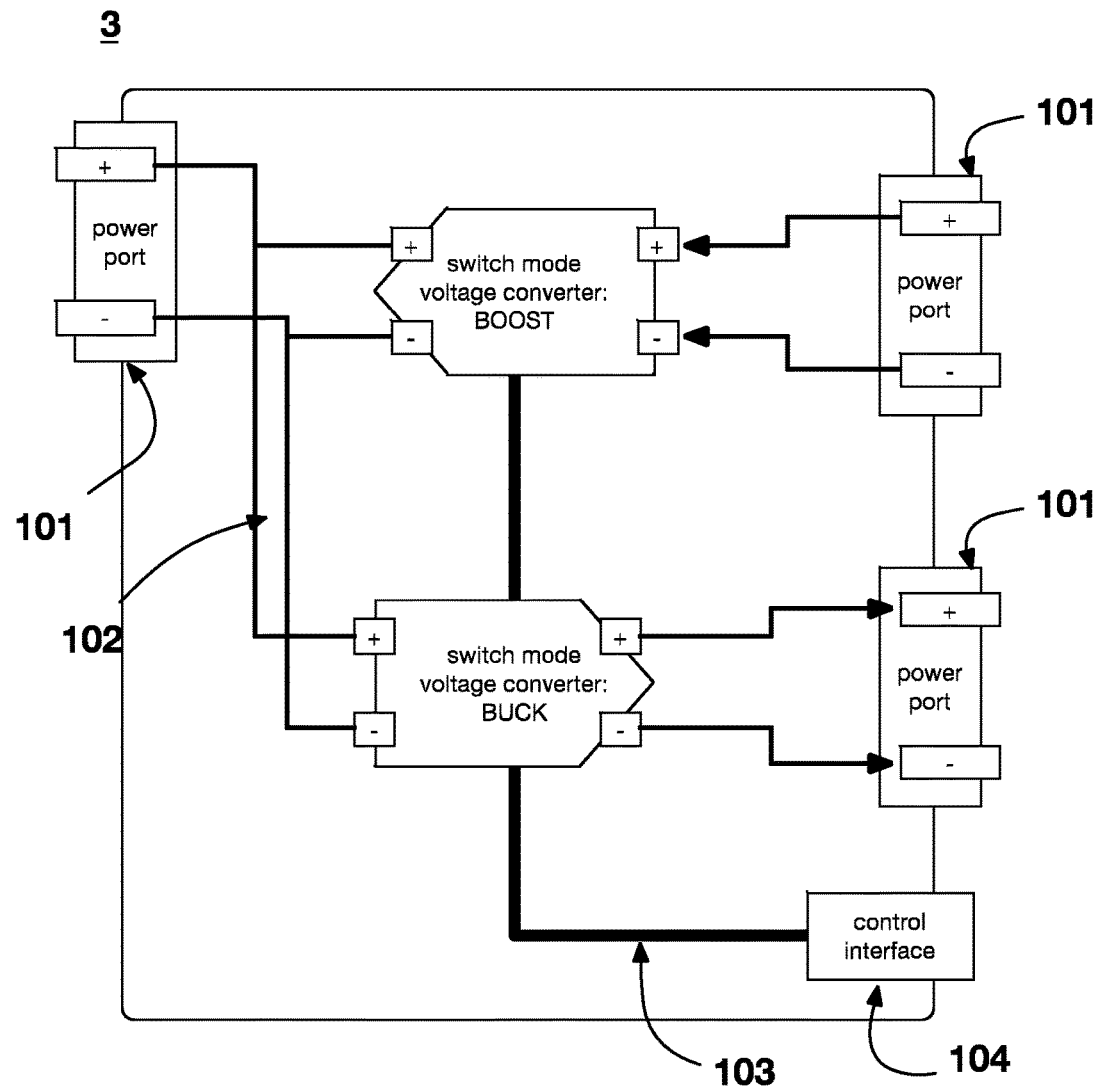
FIG. 9H schematically shows another DC-voltage conversion device having three power ports and one or more buck/boost converters for charging a meta-capacitor and one or more buck/boost converters for discharging a meta-capacitor.
Figure 9I:
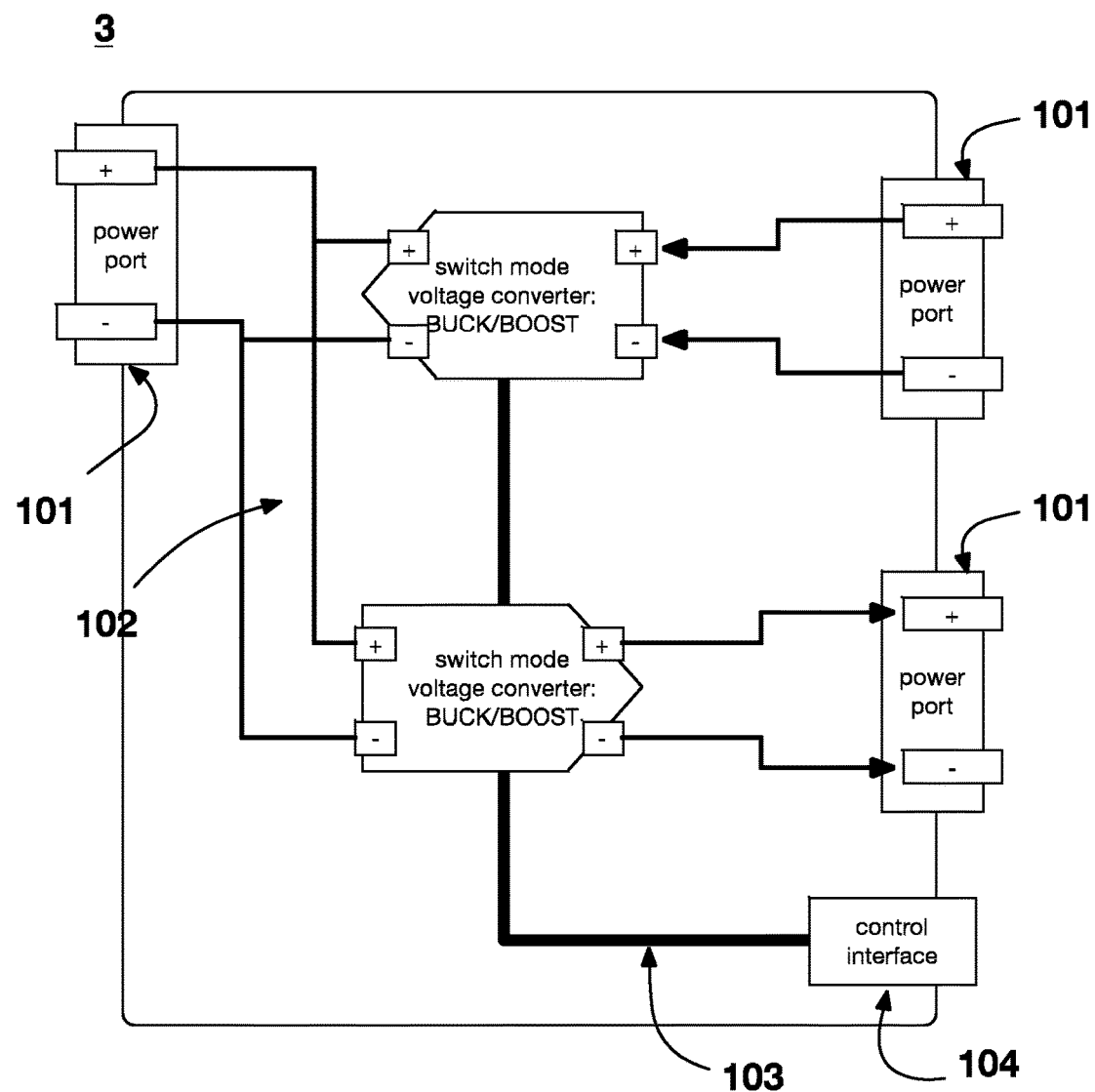
FIG. 9I schematically shows yet another DC-voltage conversion device having three power ports and one or more bidirectional boost/buck converters for the charging and discharging a meta-capacitor.
Figure 11:
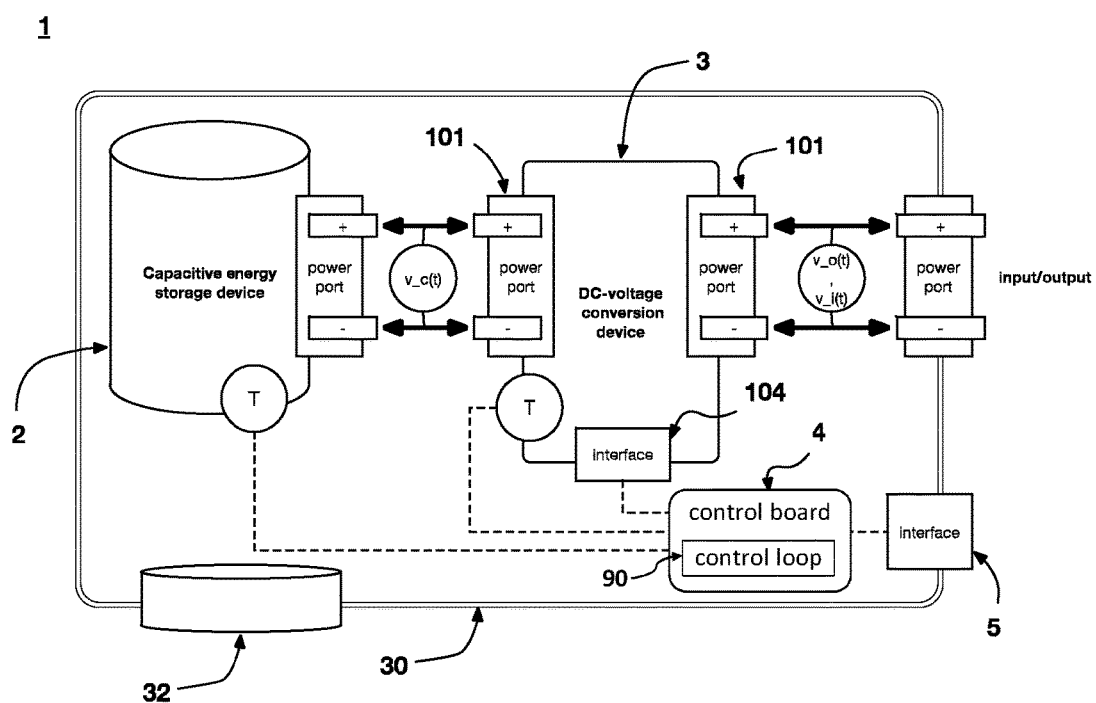
FIG. 11 schematically shows an energy storage cell according to an alternative aspect of the present disclosure.
Figure 12:
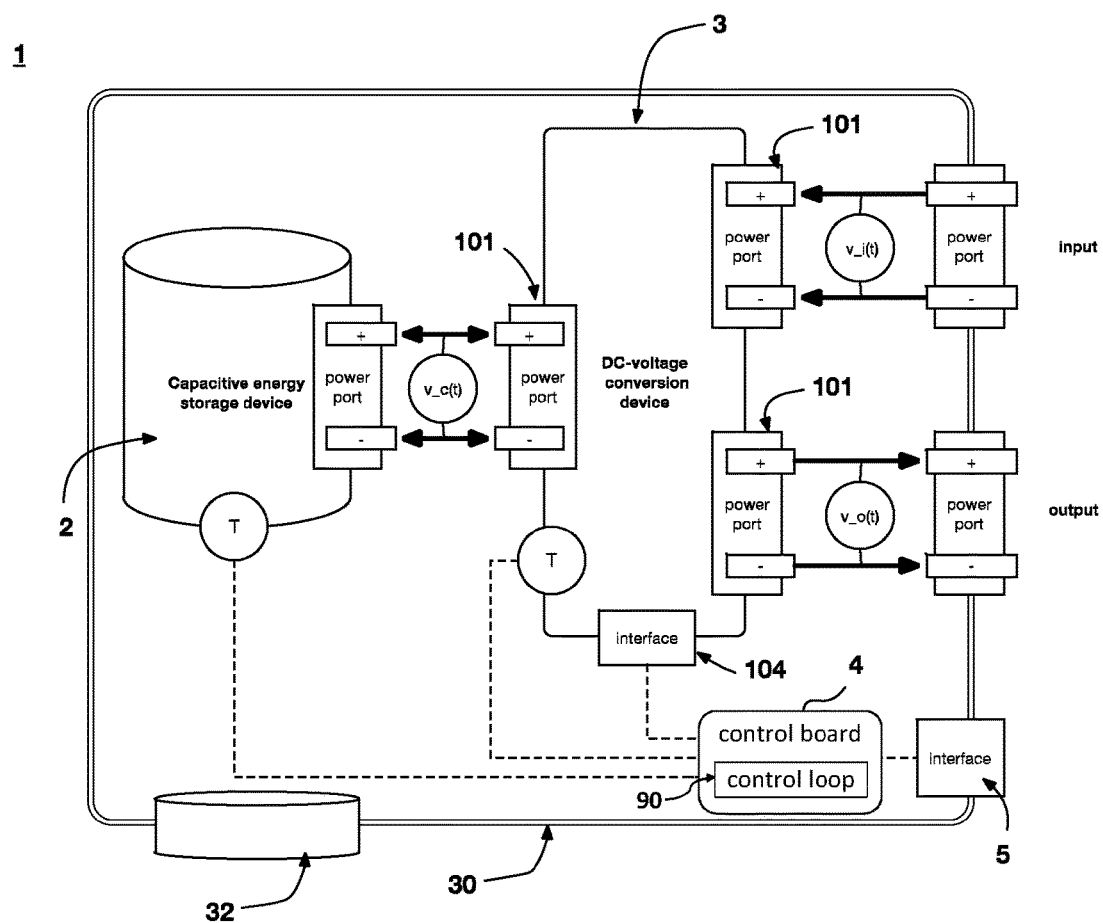
FIG. 12 schematically shows an energy storage cell according to an alternative aspect of the present disclosure.
Figure 13A:
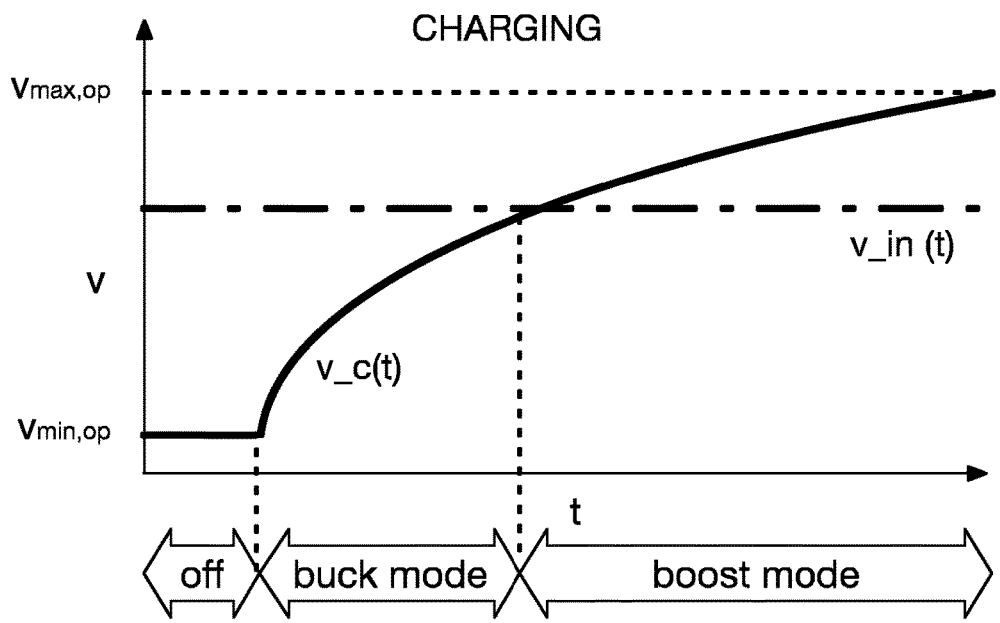
FIG. 13A shows a constant voltage V_i(t) feeding the input of a converter and voltage V_c(t) on the capacitive energy storage device during charge as the converter transitions from buck to boost in accordance with aspects of the present disclosure.
Figure 13B:
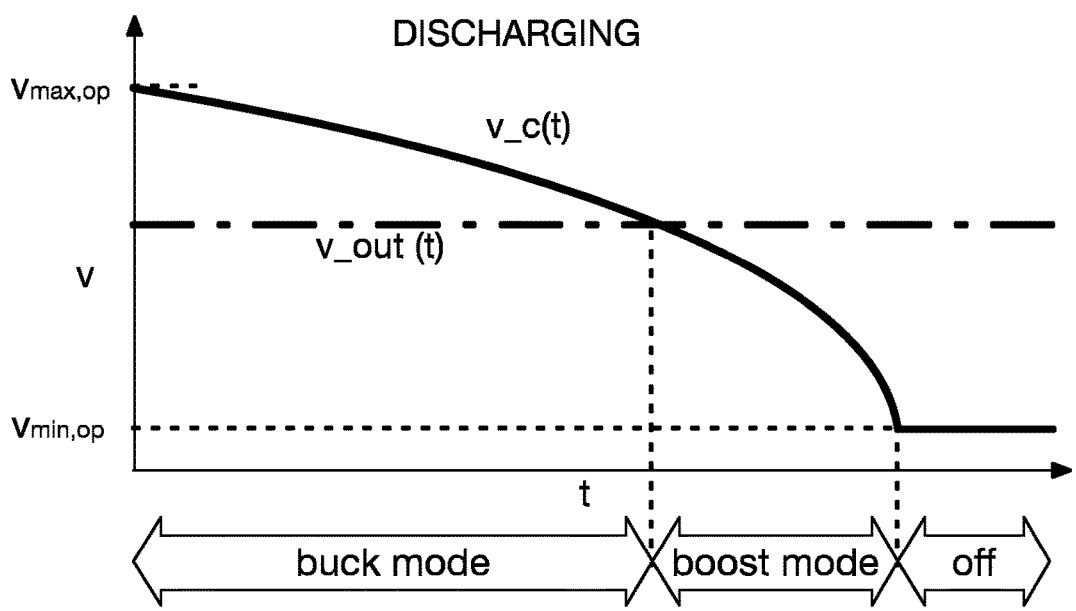
FIG. 13B shows a constant voltage V_o(t) extracted from the output side of a converter and voltage V_c(t) on the capacitive energy storage device during discharge as the converter transitions from buck to boost in accordance with aspects of the present disclosure.
Figure 14A:
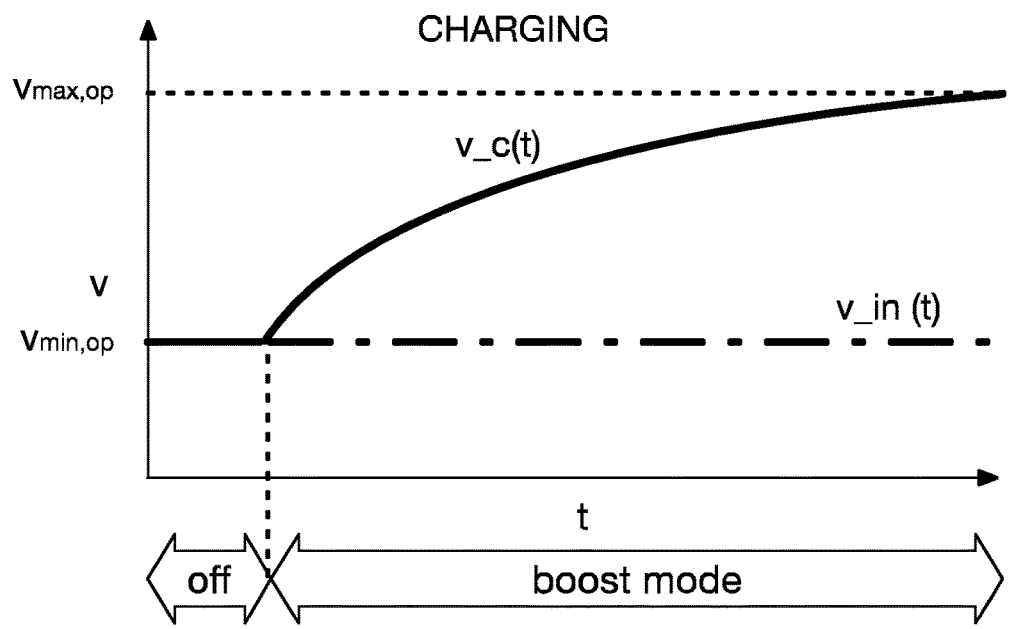
FIG. 14A shows a constant voltage V_i(t) feeding the input of a converter and voltage V_c(t) on the capacitive energy storage device during charge when Vmin,op=V_i(t) in accordance with aspects of the present disclosure.
Figure 14B:
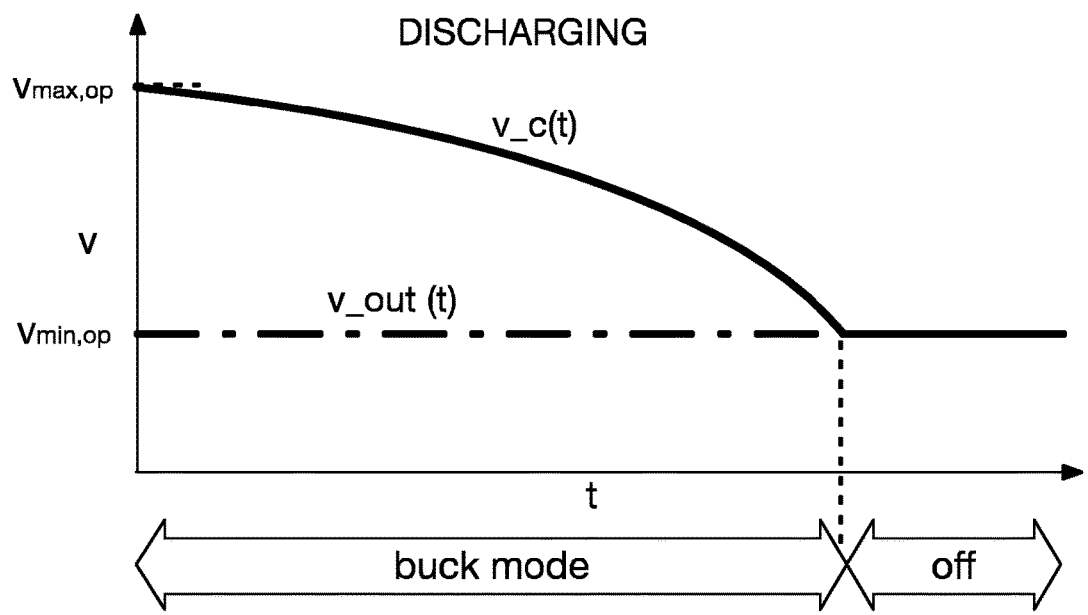
FIG. 14B shows a constant voltage V_o(t) extracted from the output side of a converter and voltage V_c(t) on the capacitive energy storage device during discharge when Vmin,op=V_i(t) in accordance with aspects of the present disclosure.

By way of example and not by limitation, the DC-voltage conversion device 3 as depicted in FIG. 9A, 9B, 9C, 9D, 9E, 9F, 9G, 9H, 9I may include one or more switch-mode voltage converters 100, arranged to boost/or buck the input/output voltages as necessary to achieve the charge and discharge modalities depicted in FIGS. 13A, 13B, 14A and 14B corresponding to the voltage labels v_c(t), v_i(t) and v_o(t) on the capacitive energy storage cell 3 of FIGS. 11 and 12. As shown in FIGS. 9F, 9G, 9H, 9I, the input/output port may be split into a separate input and output. These separate inputs and outputs may have different bus voltages. For example, there may be an input DC bus from a solar inverter which is at a different voltage than an output DC bus meant to transmit power or feed a DC to AC converter. The switch-mode voltage converters 100 may have circuitry selected from the following list: a buck converter (as show in FIG. 8B), boost converter (as show in FIG. 8A), buck/boost converter, bi-directional buck/boost (split-pi) converter (as show in FIG. 8D), Ćuk converter, single-ended primary inductor converter (SEPIC), inverting buck/boost converter (as show in FIG. 8C), or four-switch buck/boost converters.

In FIGS. 9A, 9B, 9C, 9D, 9E, 9F, 9G, 9H, 9I, the switch mode voltage converters 100 are connected to power ports 101, by an interconnect system 102. The power ports 101 include a positive terminal and negative terminal intended to work together to transmit power in either direction. A power port can be an input, output or bidirectional. A control interface 104 is connected to all of the control interfaces on the switch mode voltage converters 100 through a control network 103. The control network may carry target voltages, target currents, observed voltages, observed currents, temperatures and other parameters necessary to control the system. The control network 103, control interfaces 104, control board 4, and control loops 90 may or may not be combined in a single discrete physical package. For example, one implementation may have all aforementioned elements distributed throughout a system and another implementation may contain all elements in a single microprocessor unit.

In one implementation the control board 4 may control the DC-voltage converter 3 in a way that maintains the output voltage of the energy storage cell, e.g., the output voltage of the DC-voltage converter $V_{out}$ at a constant level during a discharge of the meta-capacitor (s) (see, FIGS. 13B and 14B) from an initial charge state ((V_c(t)) to a minimum charge state (V_c(t)=Vmin,op), wherein the minimum charge state (Vmin,op), is defined by a voltage on the meta-capacitor (s) which corresponds to the residual energy equal to from 0% to 20% of the initial reserved energy, where the reserved energy of the meta-capacitor (s) can be calculated by $E=\frac{1}{2}CG^2$ where E is energy, C is capacitance, and V is voltage. In implementations where the control board 4 is a programmable device, the constant output voltage of the energy storage cell can be a programmable value.

In still another implementation of the energy storage cell, wherein the output voltage is made constant by the DC-voltage conversion device selected from the list comprising a buck regulator, a boost regulator, buck and boost regulators with separate input/outputs, bi-directional boost/buck regulator, split-pi converter.

In some implementations, the cell 1 includes circuitry configured to enable observation of parameters selected from the following list: the voltage on the meta-capacitor, the current going into or out of the meta-capacitor, the current flowing into or out of the DC-voltage conversion device, the output voltage of the DC-voltage conversion device, the temperature at one or more points within the meta-capacitor, the temperature at one or more points within the DC-voltage conversion device. In another implementation, the energy storage cell further comprises an AC-inverter to create AC output voltage, wherein the DC output voltage of the DC-voltage conversion device is the input voltage of the AC-inverter. In yet another implementation, energy storage cell further comprises power electronics switches which are based on Si insulated-gate bipolar transistors (IGBTs), SiC MOSFETs, GaN MOSFETs, Graphene or comprising organic molecular switches. In one embodiment of the energy storage cell, the power electronics switches comprise multiple switch elements stacked in series to enable switching of voltages higher than the breakdown voltage of individual switch components.

Figure 16:
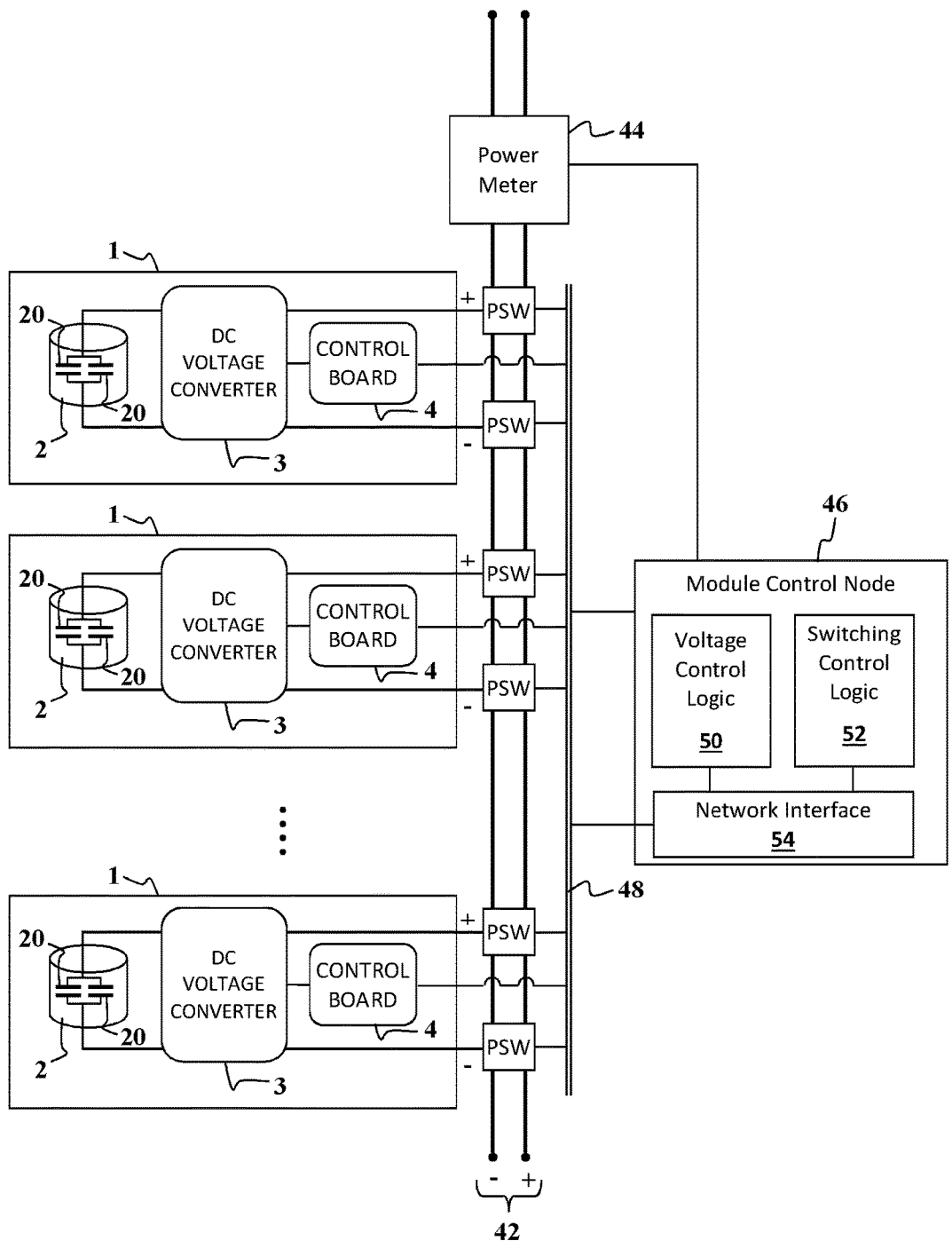
FIG. 16 shows an example of a capacitive energy storage module having two or more networked energy storage cells according to an alternative aspect of the present disclosure.

In another aspect of the present disclosure, a capacitive energy storage module 40, e.g., as illustrated in FIG. 16. In the illustrated example, the energy storage module 40 includes two or more energy storage cells 1 of the type described above. Each energy storage cell includes a capacitive energy storage device 2 having one or more meta-capacitors 20 and a DC-voltage converter 3, which may be a buck converter, boost converter, or buck/boost converter. In addition, each module may include a control board 4 of the type described above with respect to FIGS. 10,11,12, and an (optional) cooling mechanism (not shown). The module 40 may further include an interconnection system that connects the anodes and cathodes of the individual energy storage cells to create a common anode and common cathode of the capacitive energy storage module.

In yet another aspect, some implementations, the interconnection system includes a parameter bus 42 and power switches PSW. Each energy storage cell 1 in the module 40 may be coupled to the parameter bus 42 via the power switches PSW. These switches allow two or more modules to be selectively coupled in parallel or in series via two or more rails that can serve as the common anode and common cathode. The power switches can also allow one or more energy storage cells to be disconnected from the module, e.g., to allow for redundancy and/or maintenance of cells without interrupting operation of the module. The power switches PSW may be based on solid state power switching technology or may be implemented by electromechanical switches (e.g., relays) or some combination of the two.

In some implementations, the energy storage module further comprises a power meter 44 to monitor power input or output to the module. In some implementations, the energy storage module further comprises a networked control node 46 configured to control power output from and power input to the module. The networked control node 46 allows each module to talk with a system control computer over a high speed network. The networked control node 46 includes voltage control logic circuitry 50 configured to selectively control the operation of each of voltage controller 3 in each of the energy storage cells 2, e.g., via their respective control boards 4. The control node 46 may also include switch control logic circuitry 52 configured to control operation of the power switches PSW. The control boards 4 and power switches PSW may be connected to the control node 46 via a data bus 48. The voltage control and switching logic circuitry in the networked control node 46 may be implemented by one or more microprocessors, microcontrollers, application specific integrated circuits (ASICs), field programmable gate arrays (FPGAs), or complex programmable logic devices (CPLDs). The control node 46 may include a network interface 54 to facilitate transfer of signals between the voltage control logic circuitry 50 and the control boards 4 on the individual energy storage cells 2 and also to transfer signals between the switching logic circuitry 52 and the power switches PSW, e.g., via the data bus 48.

Figure 17:
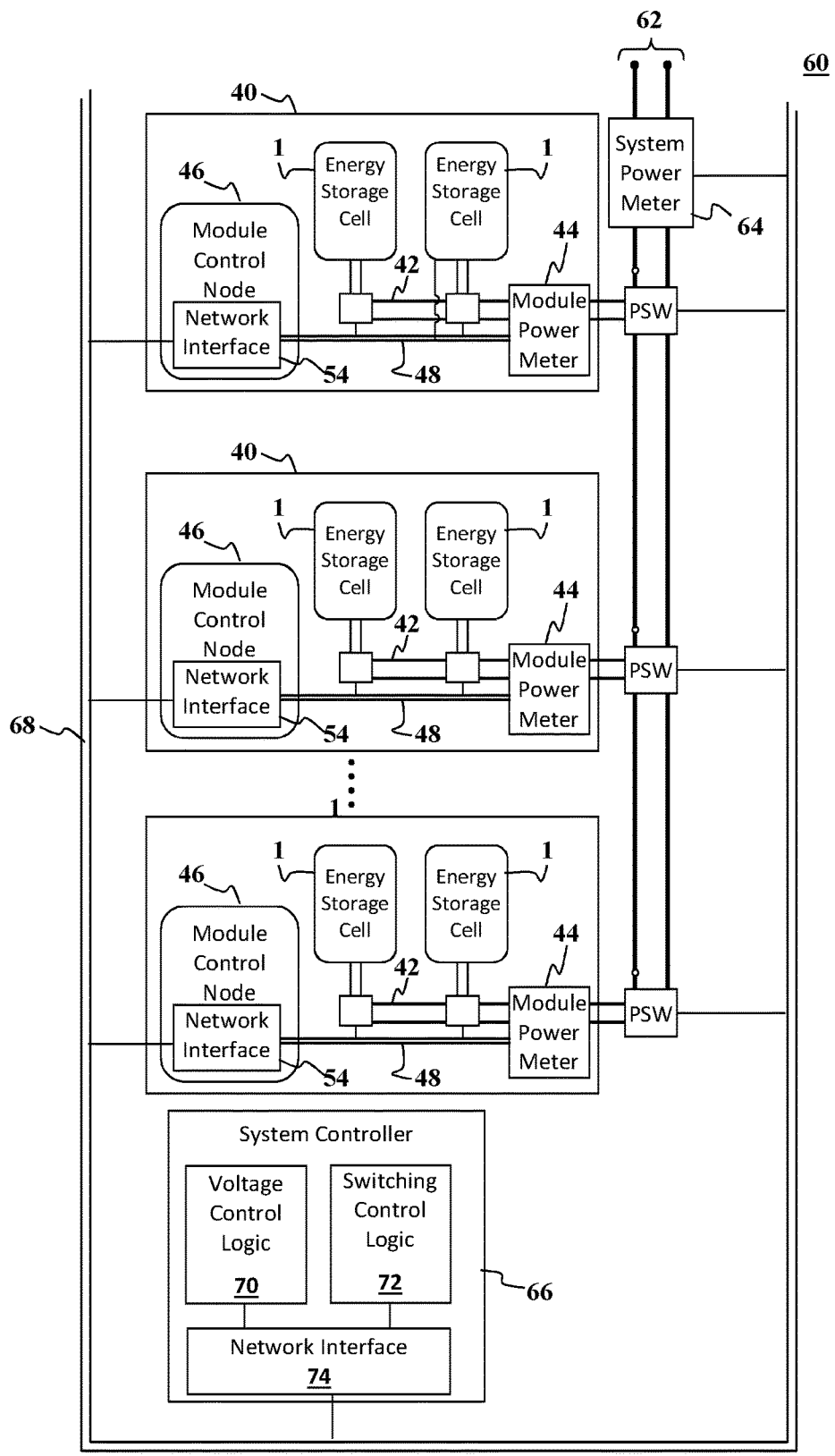
FIG. 17 shows an example of a capacitive energy storage system having two or more energy storage networked modules according to an alternative aspect of the present disclosure.

According to yet another aspect of the present disclosure a capacitive energy storage system may include two or more networked capacitive energy storage modules, e.g., of the type shown in FIG. 16. One embodiment of such a capacitive energy storage system 60 is shown in FIG. 17. The system 60 includes two or more energy storage modules 40 of the type shown in FIG. 16. Each capacitive energy storage module 40 includes two or more capacitive energy storage cells 1, e.g., of the type shown in FIGS. 10, 11, 12, connected by an interconnection system 42 and controlled by a control node 46. Each capacitive energy storage module may also include a module power meter 44. Although it is not shown in FIG. 16, each control node 46 may include voltage control logic circuitry 50 to control voltage controllers within the individual capacitive energy storage cells 1 and switching logic circuitry 52 to control internal power switches with the module, as described above. In addition, each control node 46 includes an internal data bus 48 and a network interface 54, which may be connected as described above. Power to and from capacitive energy storage modules 40 is coupled to a system power bus 62 via system power switches SPSW, which may be based on solid state power switching technology or may be implemented by electromechanical switches (e.g., relays) or some combination of the two. In some implementations, there may be an inverter (not shown) coupled between each capacitive energy storage module 40 and the system power bus 62 to convert DC power from the module to AC power or vice versa.

The system 60 includes a system controller 66 connected to a system data bus 68. The system controller may include switching control logic 70, voltage control logic 72, and system network interface 74. The voltage control logic 70 may be configured to control the operation of individual DC-voltage controllers within individual cells 1 of individual modules 40. The switching control logic 72 may be configured to control operation of the system power switches SPSW and also the power switches PSW within individual capacitive energy storage modules 40. Voltage control signals may be sent from the voltage control logic 72 to a specific DC-voltage control device 3 within a specific capacitive energy storage cell 1 of a specific capacitive energy storage module through the network interface 74, the system data bus 68, the module network interface 54 of the control node 46 for the specific module, the module data bus 48, and the control board 4 of the individual cell 1.

By way of example, and not by way of limitation, the system controller 66 may be a deterministic controller, an asynchronous controller, or a controller having distributed clock. In one particular embodiment of the capacitive energy storage system 60, the system controller 66 may include a distributed clock configured to synchronize several independent voltage conversion devices in one or more capacitive energy storage cells of one or more of the capacitive energy storage modules 40.

Aspects of the present disclosure allow for electrical energy storage on a much larger scale than possible with conventional electrical energy storage systems. A wide range of energy storage needs can be met by selectively combining one or more meta-capacitors with a DC-voltage conversion devices into a cell, combining two or more cells into a module, or combining two or more modules into systems.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. An energy storage cell comprising:
   at least one capacitive energy storage device; and
   a DC-voltage conversion device;
   wherein the capacitive energy storage device comprises one or more meta-capacitors, wherein the one or more metacapacitors comprise a first and second electrodes and a meta-dielectric material layer disposed between the first and second electrodes, wherein the meta-dielectric material layer is comprised of one or more composite organic compounds characterized by polarizability and resistivity, wherein a relative permittivity of the meta-dielectric material layer is equal to or greater than 100,
   wherein the output voltage of the capacitive energy storage device is an input voltage of the DC-voltage conversion device during discharging the capacitive energy storage device,
   wherein the input voltage of the capacitive energy storage device is an output voltage of the DC-voltage conversion device while charging the capacitive energy storage device.

2. The energy storage cell of claim 1, wherein a resistivity of the meta-dielectric material layer is equal to or greater than $10^{13}$ ohm/cm.

3. The energy storage cell of claim 1, wherein the meta-dielectric material layer includes one or more types of Sharp polymers and/or one or more types of Furuta polymers.

4. The energy storage cell of claim 3, wherein the meta-dielectric layer includes two or more Furuta polymers, including a Furuta polymer having an immobilized ion liquid group of a cationic type.

5. The energy storage cell of claim 3, wherein the meta-dielectric layer includes two or more Furuta polymers including a Furuta polymer having an immobilized ion liquid group of an anionic type.

6. The energy storage cell of any one of claims 1, 2 and 3-5, wherein said one or more meta-capacitors have a breakdown field greater than or equal to about 0.01V/nm.

7. The energy storage cell according to claim 1, further comprising a cooling mechanism in thermal contact with the capacitive energy storage device and/or the DC-voltage converter.

8. The energy storage cell according to claim 7, wherein the cooling mechanism is a passive cooling mechanism, or wherein air, water or ethylene glycol can be used as a coolant.

9. The energy storage cell according to claim 7, wherein the cooling mechanism is configured to remove heat from the capacitive energy storage device and/or the DC-voltage converter with a phase-change material.

10. The energy storage cell according to claim 7, wherein the cooling mechanism includes a reservoir containing a solid to liquid phase change material.

11. The energy storage cell according to claim 10, wherein the solid to liquid phase change material is paraffin wax.

12. The energy storage cell according to claim 1, wherein the DC-voltage conversion device comprises a control board based on a buck converter, boost converter, buck/boost converter, bi-directional buck/boost (split-pi) converter, Ćuk converter, single-ended primary inductor converter (SEPIC), inverting buck/boost converter, or four-switch buck/boost converters.

13. The energy storage cell according to claim 12, wherein the control board is configured to maintain a constant output voltage of the energy storage cell during a discharge of the one or more meta-capacitors from an initial charge state to a minimum charge state, wherein the minimum charge state is defined by a voltage on the meta-capacitor(s) which corresponds to a residual energy equal to from 0% to 20% of an initial reserved energy stored on the meta-capacitor(s).

14. The energy storage cell according to claim 13, wherein the constant output voltage of the energy storage cell is programmable by the control board.

15. The energy storage cell according to claim 13, wherein the DC-voltage conversion device comprises one or more switch-mode voltage converters wherein a switch-mode voltage converter is configured as a buck converter, boost converter, buck/boost converter, bi-directional buck/boost (split-pi) converter, Ćuk converter, single-ended primary inductor converter (SEPIC), inverting buck/boost converter, or four-switch buck/boost converters.

16. The energy storage cell according to claim 13, further comprising circuitry configured to enable observation of parameters selected from the following list: a voltage on the one or more meta-capacitors, a current going into or out of the one or more meta-capacitors, a current flowing into or out of the DC-voltage conversion device, an output voltage of the DC-voltage conversion device, a temperature at one or more points within the one or more meta-capacitors, a temperature at one or more points within the DC-voltage conversion device.

17. The energy storage cell according to claim 13, further comprising a power inverter configured to receive a direct current (DC) output voltage from the DC-voltage converter and configured to convert the DC output voltage from the DC-voltage converter to an alternating current (AC) output voltage.

18. The energy storage cell according to claim 1, wherein the DC-voltage converter includes power electronics switches based on silicon (Si) insulated-gate bipolar transistors (IGBTs), silicon carbide (SiC) metal oxide semiconductor field effect transistors (MOSFETs), gallium nitride (GaN) MOSFETs, Graphene or organic molecular switches.

19. The energy storage cell according to claim 18, wherein the power electronics switches comprise multiple switch elements stacked in series.

20. A capacitive energy storage module comprising two or more individual energy storage cells having anodes and cathodes and an interconnection system, wherein the interconnection system connects the anodes and cathodes of the individual energy storage cells to create a common anode and common cathode of the capacitive energy storage module, wherein each individual energy storage cell includes one or more meta-capacitors coupled to a DC-voltage conversion device, wherein each individual energy storage cell includes at least one capacitive energy storage device and a DC-voltage conversion device;
   wherein the capacitive energy storage device comprises one or more meta-capacitors, wherein the one or more metacapacitors comprise a first and second electrodes and a meta-dielectric material layer disposed between the first and second electrodes, wherein the meta-dielectric material layer is comprised of one or more composite organic compounds characterized by polarizability and resistivity, wherein a relative permittivity of the meta-dielectric material layer is equal to or greater than 100, wherein the output voltage of the capacitive energy storage device is an input voltage of the DC-voltage conversion device during discharging the capacitive energy storage device, wherein the input voltage of the capacitive energy storage device is an output voltage of the DC-voltage conversion device while charging the capacitive energy storage device.

21. The energy storage module of claim 20, wherein the interconnection system includes a parameter bus connected to the two or more individual energy storage cells by power switches.

22. The energy storage module of claim 20, further comprising a power meter coupled to two or more individual energy storage cells.

23. The energy storage module of claim 20, further comprising a networked control node coupled to the two or more individual energy storage cells.

24. A capacitive energy storage system comprising:

two or more capacitive energy storage modules, wherein each of the one or more storage modules includes two or more individual energy storage cells having anodes and cathodes and an interconnection system, wherein each of the two or more individual energy storage cells includes at least one capacitive energy storage device and a DC-voltage conversion device, wherein the capacitive energy storage device comprises one or more meta-capacitors, wherein the output voltage of the capacitive energy storage device is an input voltage of the DC-voltage conversion device during discharging the capacitive energy storage device, wherein the input voltage of the capacitive energy storage device is an output voltage of the DC-voltage conversion device while charging the capacitive energy storage device;

an interconnection system coupled to the two or more capacitive energy storage modules, wherein the interconnection system connects the anodes and cathodes of the individual energy storage cells to create a common anode and common cathode of the capacitive energy storage module, wherein each individual energy storage cell includes one or more meta-capacitors coupled to a DC-voltage conversion device, wherein the one or more metacapacitors comprise a first and second electrodes and a meta-dielectric material layer disposed between the first and second electrodes, wherein the meta-dielectric material layer is comprised of one or more composite organic compounds characterized by polarizability and resistivity, wherein a relative permittivity of the meta-dielectric material layer is equal to or greater than 100; and a power interconnection system and a system controller coupled to the two or more capacitive energy storage modules.

25. The capacitive energy storage system according to claim 24, wherein system controller includes a deterministic controller, an asynchronous controller, or a controller having distributed clock.

26. The capacitive energy storage system according to claim 25, wherein the distributed clock is used to synchronize several independent DC-voltage conversion devices in one or more of the individual energy storage modules.

* * * * *